United States Patent
Suzuki et al.

(10) Patent No.: US 12,037,055 B2
(45) Date of Patent: Jul. 16, 2024

(54) STEERING CONTROL DEVICE

(71) Applicants: JTEKT CORPORATION, Kariya (JP); TOYOTA JIDOSHA KABUSHIKI KAISHA, Toyota (JP)

(72) Inventors: Hiroto Suzuki, Nagoya (JP); Isao Namikawa, Okazaki (JP); Yoshio Kudo, Machida (JP); Yuki Suehiro, Ichikawa (JP); Kosuke Akatsuka, Mishima (JP)

(73) Assignees: JTEKT CORPORATION, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 304 days.

(21) Appl. No.: 17/729,083

(22) Filed: Apr. 26, 2022

(65) Prior Publication Data
US 2022/0363305 A1 Nov. 17, 2022

(30) Foreign Application Priority Data
May 14, 2021 (JP) .................................. 2021-082376

(51) Int. Cl.
*B62D 5/00* (2006.01)
*B62D 5/04* (2006.01)
*B62D 15/02* (2006.01)

(52) U.S. Cl.
CPC .......... *B62D 5/006* (2013.01); *B62D 5/0409* (2013.01); *B62D 5/0424* (2013.01); *B62D 5/046* (2013.01); *B62D 15/0235* (2013.01)

(58) Field of Classification Search
CPC .... B62D 5/006; B62D 5/0409; B62D 5/0424; B62D 5/046; B62D 15/0235; B62D 6/008; B62D 6/002; B62D 5/0403
(Continued)

(56) References Cited

U.S. PATENT DOCUMENTS 10,315,689 B2 * 6/2019 Kodera .................. B62D 5/001
11,059,516 B2 * 7/2021 Kodera .................. B62D 5/006
(Continued)

FOREIGN PATENT DOCUMENTS

EP 3219580 A1 9/2017
EP 3517406 A1 7/2019
(Continued)

OTHER PUBLICATIONS

Oct. 21, 2022 Extended European Search Report issued in European Patent Application No. 22171134.4.

*Primary Examiner* — Yi-Kai Wang
(74) *Attorney, Agent, or Firm* — Oliff PLC

(57) ABSTRACT

A steering control device includes an electronic control unit. The electronic control unit is configured to calculate a target rotation angle of a shaft rotating with a turning operation of turning wheels based on a steering angle of a steering wheel acquired from a rotation angle of a reaction motor, to calculate a command value based on the target rotation angle and a steering torque acquired from a torsion angle of a torsion bar twisting with an operation of the steering wheel, and to compensate for the torsion angle by adding the torsion angle as a compensation value to the steering angle. The electronic control unit is configured to change a value of the torsion angle that is added to the steering angle according to a degree of change of a state variable used to calculate the command value.

14 Claims, 11 Drawing Sheets

(58) Field of Classification Search
USPC .......................................................... 701/41
See application file for complete search history.

(56) References Cited

U.S. PATENT DOCUMENTS

| | | | |
|---|---|---|---|
| 2017/0267276 A1* | 9/2017 | Kodera | B62D 5/0463 |
| 2018/0237004 A1* | 8/2018 | Nasu | B60K 17/354 |
| 2022/0135117 A1 | 5/2022 | Tsubaki | |

FOREIGN PATENT DOCUMENTS

| | | |
|---|---|---|
| JP | 2003-002223 A | 1/2003 |
| JP | 2013-18354 A | 1/2013 |
| JP | 2017-165219 A | 9/2017 |
| WO | 2020213286 A1 | 10/2020 |

* cited by examiner

STEERING CONTROL DEVICE

CROSS-REFERENCE TO RELATED APPLICATION

This application claims priority to Japanese Patent Application No. 2021-082376 filed on May 14, 2021, incorporated herein by reference in its entirety.

BACKGROUND

1. Technical Field

The disclosure relates to a steering control device.

2. Description of Related Art

There has been a so-called steer-by-wire steering system in which transmission of power between a steering wheel and turning wheels is cut off. This steering system includes a reaction motor, a turning motor, and a control device. The reaction motor generates a steering reaction force which is applied to a steering shaft. The turning motor generates a turning force for turning the turning wheels. When a vehicle is traveling, the control device generates the steering reaction force by controlling the reaction motor and turns the turning wheels by controlling the turning motor.

For example, a control device described in Japanese Unexamined Patent Application Publication No. 2017-165219 (JP 2017-165219 A) calculates an ideal axial force and a road-surface axial force. The ideal axial force is an ideal rack axial force based on a target turning angle. The road-surface axial force is an estimated value of a rack axial force based on a current value of the turning motor. The control device sums the ideal axial force and the road-surface axial force at predetermined distribution proportions and controls the reaction motor using the summed axial force. Since a road surface state is reflected in the road-surface axial force, the road surface state is also reflected in the steering reaction force generated by the reaction motor. Accordingly, a driver can feel the road surface state as a response via the steering wheel.

SUMMARY

The steering control device described in JP 2017-165219 A controls the reaction motor using the ideal axial force based on the target turning angle. Accordingly, a response of the steering reaction force with respect to a steering operation is determined based on a response of the target turning angle. As a result, when the target turning angle is adjusted such that turning responsiveness corresponds to target responsiveness, the setting of the target turning angle influences the steering reaction force. On the other hand, the adjustment for achieving the target turning responsiveness may adversely affect the responsiveness of the steering reaction force.

For example, when the target turning angle is adjusted to increase the turning responsiveness, the responsiveness of the steering reaction force may become excessively high. Due to excessive increase in responsiveness of the steering reaction force, the ideal axial force calculated by the control device and the steering reaction force which is applied to the steering wheel may change suddenly. Accordingly, there is a concern that a feeling of steering of the steering wheel may deteriorate and a driver may feel discomfort.

According to an aspect of the disclosure, there is provided a steering control device configured to control a reaction motor that generates a steering reaction force applied to a steering wheel based on a command value that is calculated according to a steering state, transmission of power between the steering wheel and a turning shaft that turns turning wheels being cut off. The steering control device is configured to control a turning motor that generates a turning force for turning the turning wheels according to the steering state. The steering control device includes an electronic control unit configured to: calculate a target rotation angle of a shaft rotating with a turning operation of the turning wheels based on a steering angle of the steering wheel acquired from a rotation angle of the reaction motor; calculate the command value based on the target rotation angle and a steering torque acquired from a torsion angle of a torsion bar twisting with an operation of the steering wheel; and compensate for the torsion angle by adding the torsion angle as a compensation value to the steering angle. The electronic control unit is configured to change a value of the torsion angle that is added to the steering angle according to a degree of change of a state variable used to calculate the command value.

With this configuration, the value of the torsion angle that is added to the steering angle is changed according to the degree of change of the state variable used to calculate the command value. Accordingly, it is possible to curb sudden change of the command value due to addition of the torsion angle to the steering angle. As a result, it is possible to secure a good feeling of steering and to improve turning responsiveness with respect to an operation of the steering wheel.

In the steering control device according to the aspect, the electronic control unit may be configured to calculate the command value using an axial force of the turning shaft which is calculated based on the state variable. In this case, the electronic control unit may be configured to change the value of the torsion angle that is added to the steering angle according to a slope which is a rate of change of the axial force with respect to the state variable.

With this configuration, the value of the torsion angle that is added to the steering angle is changed according to the slope that is the rate of change of the axial force with respect to the state variable used to calculate the command value. Accordingly, it is possible to curb sudden change of the command value due to addition of the torsion angle to the steering angle. As a result, it is possible to secure a good feeling of steering and to improve turning responsiveness with respect to an operation of the steering wheel.

In the steering control device according to the aspect, the electronic control unit may be configured to calculate the command value using an axial force of the turning shaft which is calculated based on the state variable. In this case, the electronic control unit may be configured to determine whether the torsion angle of the torsion bar is to be added to the steering angle, based on a slope that is a rate of change of the axial force with respect to the state variable.

With this configuration, whether the torsion angle of the torsion bar is to be added to the steering angle is determined based on the slope that is the rate of change of the axial force with respect to the state variable used to calculate the command value. Accordingly, it is possible to curb sudden change of the command value due to addition of the torsion angle to the steering angle. As a result, it is possible to secure a good feeling of steering and to improve turning responsiveness with respect to an operation of the steering wheel.

In the steering control device according to the aspect, the axial force may be an angle axial force that is calculated based on the target rotation angle. With this configuration, the value of the torsion angle that is added to the steering angle is changed according to the slope that is the rate of change of the angle axial force, or whether the torsion angle of the torsion bar is to be added to the steering angle is determined, based on the slope that is the rate of change of the angle axial force.

In the steering control device according to the aspect, the axial force may be a distributed axial force that is acquired by summing values obtained by multiplying an angle axial force that is an axial force of the turning shaft calculated based on the target rotation angle and a current axial force that is an axial force of the turning shaft calculated based on a value of a current of the turning motor by respective distribution proportions that are individually set based on the target rotation angle and a vehicle speed.

With this configuration, the value of the torsion angle that is added to the steering angle is changed according to the slope that is the rate of change of the distributed axial force, or whether the torsion angle of the torsion bar is to be added to the steering angle is determined based on the slope that is the rate of change of the distributed axial force.

In the steering control device according to the aspect, the electronic control unit may be configured to calculate the command value using a distributed axial force that is acquired by summing values obtained by multiplying an angle axial force that is an axial force of the turning shaft calculated based on the target rotation angle and a current axial force that is an axial force of the turning shaft calculated based on a value of a current of the turning motor by respective distribution proportions that are individually set based on the target rotation angle and a vehicle speed. In this case, the electronic control unit may be configured to change the value of the torsion angle that is added to the steering angle according to the distribution proportion that is individually set for the current axial force and a lateral acceleration that is an acceleration at a time when a vehicle is turning.

With this configuration, the value of the torsion angle that is added to the steering angle is changed according to the distribution proportion that is individually set for the current axial force and the lateral acceleration that is an acceleration at a time when the vehicle is turning. Accordingly, it is possible to curb sudden change of the command value due to addition of the torsion angle to the steering angle. As a result, it is possible to secure a good feeling of steering and to improve turning responsiveness with respect to an operation of the steering wheel.

In the steering control device according to the aspect, the electronic control unit may be configured to calculate the command value using a distributed axial force that is acquired by summing values obtained by multiplying an angle axial force that is an axial force of the turning shaft calculated based on the target rotation angle and a current axial force that is an axial force of the turning shaft calculated based on a value of a current of the turning motor by respective distribution proportions that are individually set based on the target rotation angle and a vehicle speed. In this case, the electronic control unit may be configured to determine whether the torsion angle of the torsion bar is to be added to the steering angle, based on the distribution proportion that is individually set for the current axial force and a lateral acceleration that is an acceleration at a time when a vehicle is turning.

With this configuration, whether the torsion angle of the torsion bar is to be added to the steering angle is determined according to the distribution proportion that is individually set for the current axial force and the lateral acceleration that is an acceleration at a time when the vehicle is turning. Accordingly, it is possible to curb sudden change of the command value due to addition of the torsion angle to the steering angle. As a result, it is possible to secure a good feeling of steering and to improve turning responsiveness with respect to an operation of the steering wheel.

In the steering control device according to the aspect, the electronic control unit may be configured to change the value of the torsion angle that is added to the steering angle according to a slope that is a rate of change of the target rotation angle with respect to the steering angle.

With this configuration, the value of the torsion angle that is added to the steering angle is changed according to the slope that is the rate of change of the target rotation angle with respect to the steering angle. Accordingly, it is possible to curb sudden change of the command value due to addition of the torsion angle to the steering angle. As a result, it is possible to secure a good feeling of steering and to improve turning responsiveness with respect to an operation of the steering wheel.

In the steering control device according to the aspect, the electronic control unit may be configured to determine whether the torsion angle of the torsion bar is to be added to the steering angle, according to a slope that is a rate of change of the target rotation angle with respect to the steering angle.

With this configuration, whether the torsion angle of the torsion bar is to be added to the steering angle is determined based on the slope that is the rate of change of the target rotation angle with respect to the steering angle. Accordingly, it is possible to curb sudden change of the command value due to addition of the torsion angle to the steering angle. As a result, it is possible to secure a good feeling of steering and to improve turning responsiveness with respect to an operation of the steering wheel.

In the steering control device according to the aspect, the electronic control unit may be configured to calculate the command value using a distributed axial force that is acquired by summing values obtained by multiplying an angle axial force that is an axial force of the turning shaft calculated based on the target rotation angle and a current axial force that is an axial force of the turning shaft calculated based on a value of a current of the turning motor by respective distribution proportions that are individually set based on the target rotation angle and a vehicle speed. In this case, the electronic control unit may be configured to change the value of the torsion angle that is added to the steering angle according to the distribution proportion that is individually set for the current axial force.

With this configuration, the value of the torsion angle that is added to the steering angle is changed according to the distribution proportion that is individually set for the current axial force. Accordingly, it is possible to curb sudden change of the command value due to addition of the torsion angle to the steering angle. As a result, it is possible to secure a good feeling of steering and to improve turning responsiveness with respect to an operation of the steering wheel.

In the steering control device according to the aspect, the electronic control unit may be configured to calculate the command value using a distributed axial force that is acquired by summing values obtained by multiplying an angle axial force that is an axial force of the turning shaft calculated based on the target rotation angle and a current axial force that is an axial force of the turning shaft calculated based on a value of a current of the turning motor by respective distribution proportions that are individually set based on the target rotation angle and a vehicle speed. In this case, the electronic control unit may be configured to determine whether the torsion angle of the torsion bar is to be added to the steering angle, based on the distribution proportion that is individually set for the current axial force.

With this configuration, whether the torsion angle of the torsion bar is to be added to the steering angle is determined according to the distribution proportion that is individually set for the current axial force. Accordingly, it is possible to curb sudden change of the command value due to addition of the torsion angle to the steering angle. As a result, it is possible to secure a good feeling of steering and to improve turning responsiveness with respect to an operation of the steering wheel.

In the steering control device according to the aspect, the electronic control unit may be configured to calculate the command value using a distributed axial force that is acquired by summing values obtained by multiplying an angle axial force that is an axial force of the turning shaft calculated based on the target rotation angle and a current axial force that is an axial force of the turning shaft calculated based on a value of a current of the turning motor by respective distribution proportions that are individually set based on the target rotation angle and a vehicle speed. In this case, the electronic control unit may be configured to change the value of the torsion angle that is added to the steering angle according to a first slope that is a rate of change of the current axial force with respect to the target rotation angle and a second slope that is a rate of change of the distributed axial force with respect to the target rotation angle.

With this configuration, the torsion angle that is added to the steering angle is changed according to the first slope that is a rate of change of the current axial force with respect to the target rotation angle and the second slope that is a rate of change of the distributed axial force with respect to the target rotation angle. Accordingly, it is possible to curb sudden change of the command value due to addition of the torsion angle to the steering angle. As a result, it is possible to secure a good feeling of steering and to improve turning responsiveness with respect to an operation of the steering wheel.

With the steering control device according to the aspect of the disclosure, it is possible to secure a good feeling of steering and to improve turning responsiveness with respect to an operation of the steering wheel.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

First Embodiment

Hereinafter, a first embodiment in which a steering control device is applied to a steer-by-wire steering system will be described.

Figure 1:
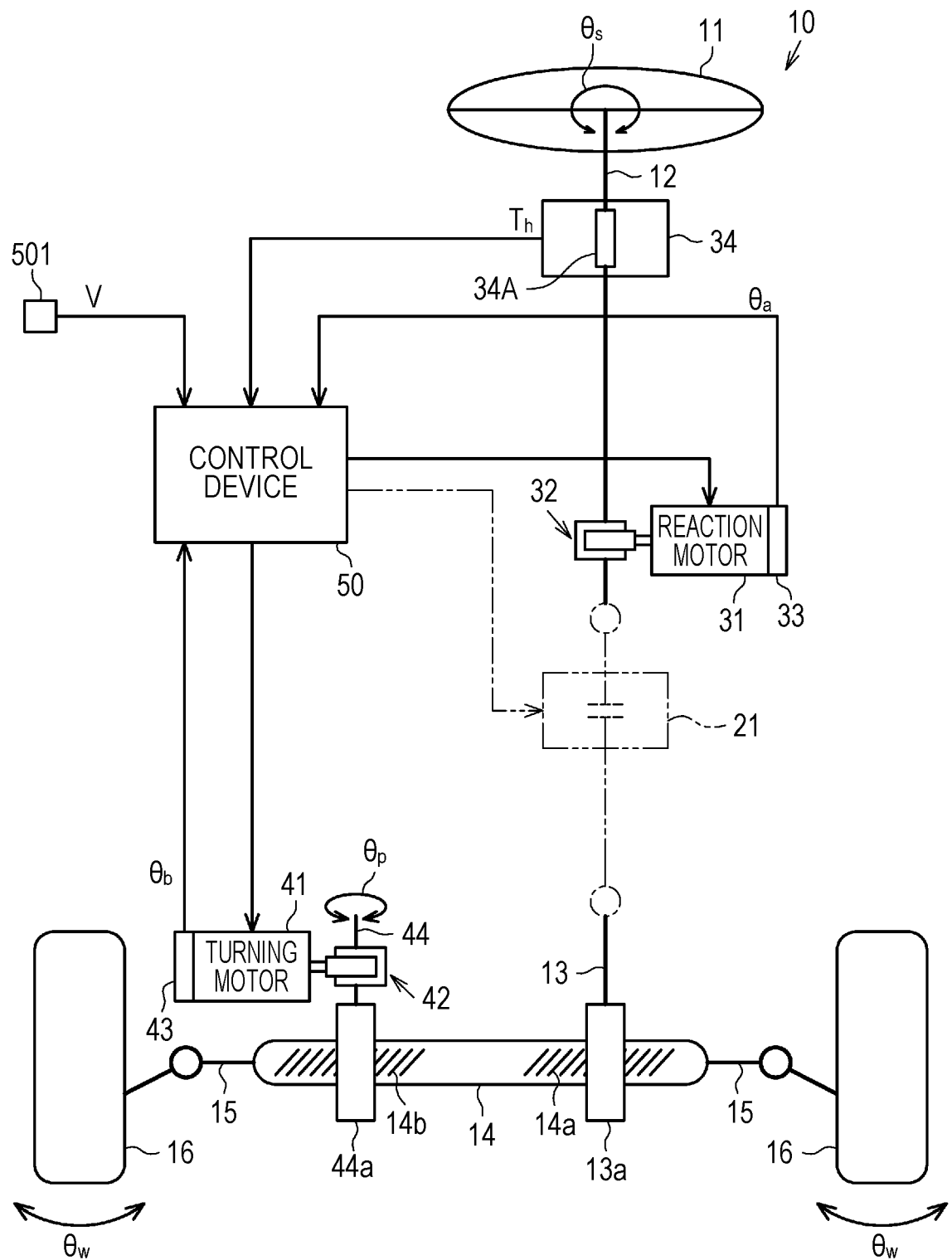
FIG. 1 is a diagram illustrating a configuration of a steering system in which a steering control device according to a first embodiment is mounted.

As illustrated in FIG. 1, a steering system 10 of a vehicle includes a steering shaft 12 that is connected to a steering wheel 11. The steering system 10 includes a turning shaft 14 that extends in a vehicle width direction (a lateral direction in FIG. 1). Right and left turning wheels 16 are connected to ends of the turning shaft 14 via tie rods 15 and 15. When the turning shaft 14 moves in a straight direction, a turning angle $\theta_w$ of the turning wheels 16 changes. The steering shaft 12 and the turning shaft 14 constitute a steering mechanism of the vehicle.

The steering system 10 includes a reaction motor 31, a speed reduction mechanism 32, a rotation angle sensor 33, and a torque sensor 34 as constituents for generating a steering reaction force. A steering reaction force is a force acting in a direction opposite to a direction in which a driver steers the steering wheel 11. It is possible to give an appropriate response to the driver by applying the steering reaction force to the steering wheel 11.

The reaction motor 31 is a source of the steering reaction force. For example, a three-phase brushless motor is employed as the reaction motor 31. A rotation shaft of the reaction motor 31 is connected to the steering shaft 12 via the speed reduction mechanism 32. A torque of the reaction motor 31 is applied as the steering reaction force to the steering shaft 12.

The rotation angle sensor 33 is provided in the reaction motor 31. The rotation angle sensor 33 detects a rotation angle $\theta_a$ of the reaction motor 31. The rotation angle $\theta_a$ of the reaction motor 31 is used to calculate a steering angle $\theta_s$. The reaction motor 31 and the steering shaft 12 operate in conjunction with each other via the speed reduction mechanism 32. Accordingly, there is a correlation between the rotation angle $\theta_a$ of the reaction motor 31 and a rotation angle of the steering shaft 12, and thus, there is a correlation between the rotation angle $\theta_a$ of the reaction motor 31 and the steering angle $\theta_s$ which is a rotation angle of the steering wheel 11. As a result, the steering angle $\theta_s$ can be calculated based on the rotation angle $\theta_a$ of the reaction motor 31.

The torque sensor 34 detects a steering torque $T_h$ which is a torque applied to the steering shaft 12 by rotational operation of the steering wheel 11. The torque sensor 34 detects the steering torque $T_h$ applied to the steering shaft 12 based on an amount of torsion of a torsion bar 34A provided in a part of the steering shaft 12. The torque sensor 34 is provided in a part of the steering shaft 12 closer to the steering wheel 11 than the speed reduction mechanism 32 is.

The steering system 10 includes a turning motor 41, a speed reduction mechanism 42, and a rotation angle sensor 43, as constituents for generating a turning force which is a force for turning the turning wheels 16.

The turning motor 41 is a source of a turning force. For example, a three-phase brushless motor is employed as the turning motor 41. A rotation shaft of the turning motor 41 is connected to a pinion shaft 44 via the speed reduction mechanism 42. Pinion teeth 44a of the pinion shaft 44 engage with rack teeth 14b of the turning shaft 14. A torque of the turning motor 41 is applied as the turning force to the turning shaft 14 via the pinion shaft 44. With rotation of the turning motor 41, the turning shaft 14 moves in the vehicle width direction which is the lateral direction in FIG. 1.

The rotation angle sensor 43 is provided in the turning motor 41. The rotation angle sensor 43 detects a rotation angle $\theta_b$ of the turning motor 41. In addition, the steering system 10 includes a pinion shaft 13. The pinion shaft 13 is provided to cross the turning shaft 14. Pinion teeth 13a of the pinion shaft 13 engage with the rack teeth 14a of the turning shaft 14. The pinion shaft 13 is provided so that the turning shaft 14 is supported in a housing which is not illustrated along with the pinion shaft 44. That is, by a support mechanism (not illustrated) which is provided in the steering system 10, the turning shaft 14 is supported to be movable in an axial direction thereof and is pressed toward the pinion shafts 13 and 44. Accordingly, the turning shaft 14 is supported in the housing. Another support mechanism that supports the turning shaft 14 in the housing without using the pinion shaft 13 may be provided.

The steering system 10 includes a control device 50. The control device 50 controls the reaction motor 31 and the turning motor 41 based on detection results from various kinds of sensors which are mounted in the vehicle. Such sensors include a vehicle speed sensor 501 in addition to the rotation angle sensor 33, the torque sensor 34, and the rotation angle sensor 43. The vehicle speed sensor 501 detects a vehicle speed V which is a travel speed of the vehicle. The control device 50 is, for example, an electronic control unit (ECU) including a processor.

The control device 50 performs reaction control for generating a steering reaction force corresponding to a steering torque $T_h$ by controlling the reaction motor 31. The control device 50 calculates a target steering reaction force based on the steering torque $T_h$ and the vehicle speed V and calculates a steering reaction force command value based on the calculated target steering reaction force. The control device 50 supplies a current required for generating the steering reaction force corresponding to the steering reaction force command value to the reaction motor 31.

The control device 50 performs turning control for turning the turning wheels 16 according to a steering state by controlling the turning motor 41. The control device 50 calculates a pinion angle $\theta_p$ which is an actual rotation angle of the pinion shaft 44 based on the rotation angle $\theta_b$ of the turning motor 41 detected by the rotation angle sensor 43. The pinion angle $\theta_p$ is a value in which the turning angle $\theta_w$ of the turning wheels 16 is reflected. The control device 50 calculates a steering angle $\theta_s$ based on the rotation angle $\theta_a$ of the reaction motor 31 detected by the rotation angle sensor 33 and calculates a target pinion angle which is a target value of the pinion angle $\theta_p$ based on the calculated steering angle $\theta_s$. The control device 50 calculates a difference between the target pinion angle and the actual pinion angle $\theta_p$ and controls supply of electric power to the turning motor 41 such that the difference is cancelled.

Figure 2:
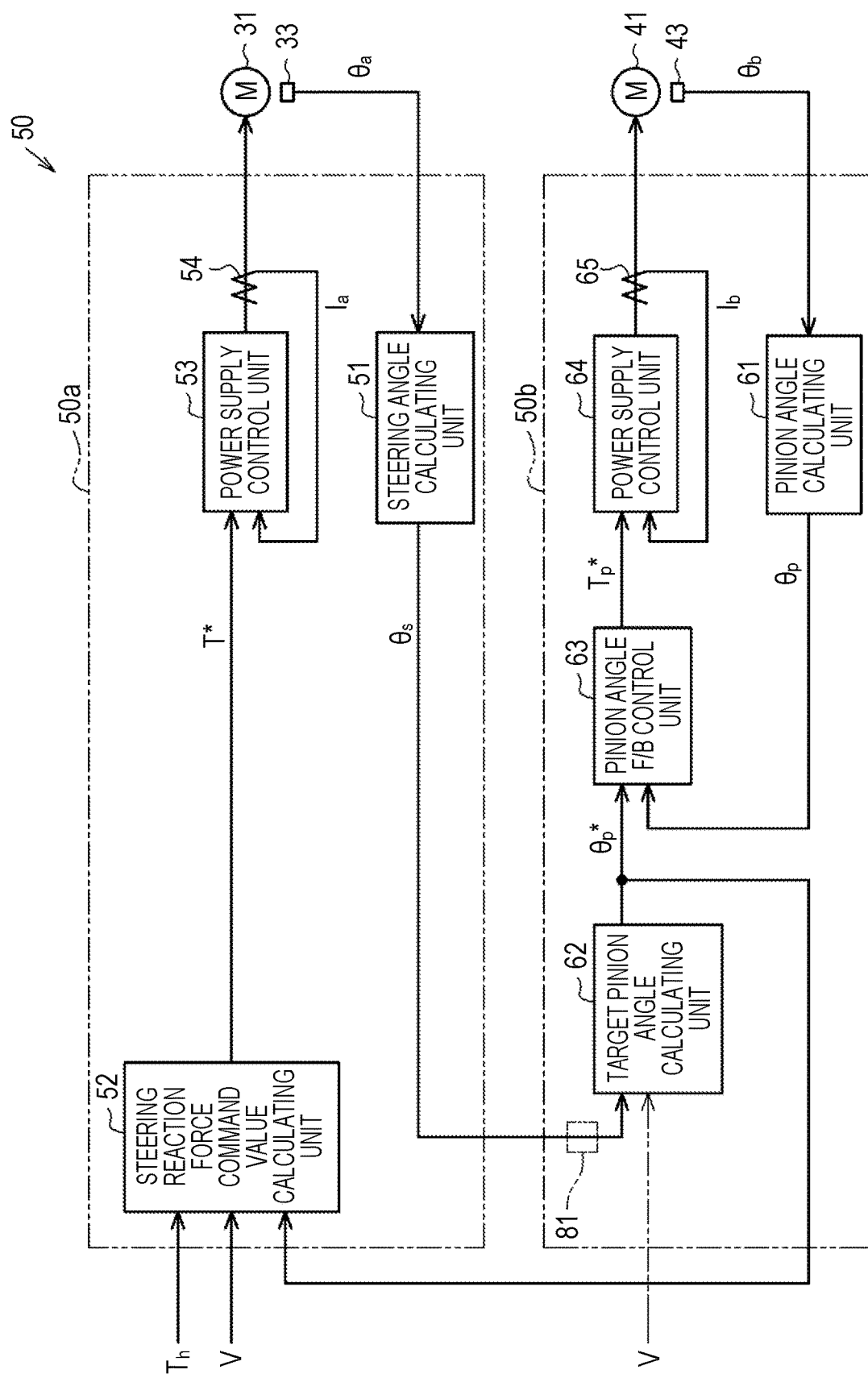
FIG. 2 is a block diagram illustrating a control device according to the first embodiment.

The control device 50 will be described below in detail. As illustrated in FIG. 2, the control device 50 includes a reaction control unit 50a that performs reaction control and a turning control unit 50b that performs turning control.

The reaction control unit 50a includes a steering angle calculating unit 51, a steering reaction force command value calculating unit 52, and a power supply control unit 53. The steering angle calculating unit 51 calculates the steering angle $\theta_s$ of the steering wheel 11 based on the rotation angle $\theta_a$ of the reaction motor 31 detected by the rotation angle sensor 33.

The steering reaction force command value calculating unit 52 calculates a steering reaction force command value T* based on the steering torque $T_h$ and the vehicle speed V. The steering reaction force command value T* is a value corresponding to a target value of a torque which is generated by the reaction motor 31. The torque generated by the reaction motor 31 is a torque acting in a direction opposite to the steering direction of the steering wheel 11. The steering reaction force command value calculating unit 52 calculates the steering reaction force command value T* such that the absolute value thereof increases as the absolute value of the steering torque $T_h$ increases and as the vehicle speed V decreases.

The power supply control unit 53 supplies electric power corresponding to the steering reaction force command value T* to the reaction motor 31. The power supply control unit 53 calculates a current command value for the reaction motor 31 based on the steering reaction force command value T*. The power supply control unit 53 detects a value of an actual current $I_a$ flowing in a power supply path to the reaction motor 31 using a current sensor 54 provided in the power supply path. The value of the current $I_a$ is a value of an actual current supplied to the reaction motor 31. The power supply control unit 53 calculates a difference between the current command value and the value of the actual current $I_a$ and controls supply of electric power to the reaction motor 31 such that the difference is cancelled. Accordingly, the reaction motor 31 generates a torque corresponding to the steering reaction force command value T*. As a result, it is possible to give, to a driver, an appropriate response in accordance with a road-surface reaction force.

The turning control unit 50b includes a pinion angle calculating unit 61, a target pinion angle calculating unit 62, a pinion angle feedback control unit 63, and a power supply control unit 64. The pinion angle calculating unit 61 calculates a pinion angle $\theta_p$ which is an actual rotation angle of the pinion shaft 44, based on the rotation angle $θ_b$ of the turning motor 41 detected by the rotation angle sensor 43. The turning motor 41 and the pinion shaft 44 operate in conjunction with each other via the speed reduction mechanism 42. Accordingly, there is a correlation between the rotation angle $θ_b$ of the turning motor 41 and the pinion angle θ. The pinion angle $θ_p$ can be calculated from the rotation angle $θ_b$ of the turning motor 41 using this correlation. The pinion shaft 44 engages with the turning shaft 14. Accordingly, there is also a correlation between the pinion angle $θ_p$ and an amount of movement of the turning shaft 14. That is, the pinion angle $θ_p$ is a value in which the turning angle $θ_w$ of the turning wheels 16 is reflected.

The target pinion angle calculating unit 62 calculates a target pinion angle $θ_p*$ based on the steering angle $θ_s$ calculated by the steering angle calculating unit 51. The target pinion angle $θ_p*$ is a target value of the pinion angle θ. For the purpose of securing steering performance, the target pinion angle calculating unit 62 calculates the target pinion angle $θ_p$ based on a point of view of changing a steering angle ratio according to the steering angle θ. The steering angle ratio is a ratio of the turning angle $θ_w$ to the steering angle $θ_s$. The target pinion angle calculating unit 62 calculates the target pinion angle $θ_p$ such that the value of the steering angle ratio decreases as the absolute value of the steering angle $θ_s$ increases.

The turning angle $θ_w$ of the turning wheels 16 at a time when the steering wheel 11 is steered becomes smaller and the response of turning angle $θ_w$ becomes slower as the value of the steering angle ratio becomes larger. When lane change or the like is performed at the time of traveling ahead, an amount of vehicle turning is smaller with respect to an amount of steering of the steering wheel 11 and thus driving stability of the vehicle is secured. The turning angle $θ_w$ of the turning wheels 16 at the time when the steering wheel 11 is steered becomes larger and the response of the turning angle $θ_w$ becomes quicker as the value of the steering angle ratio becomes smaller. When a vehicle enters a garage or the like, a larger amount of vehicle turning with respect to the amount of steering of the steering wheel 11 is obtained and thus handling performance of the vehicle is secured.

Figure 3:
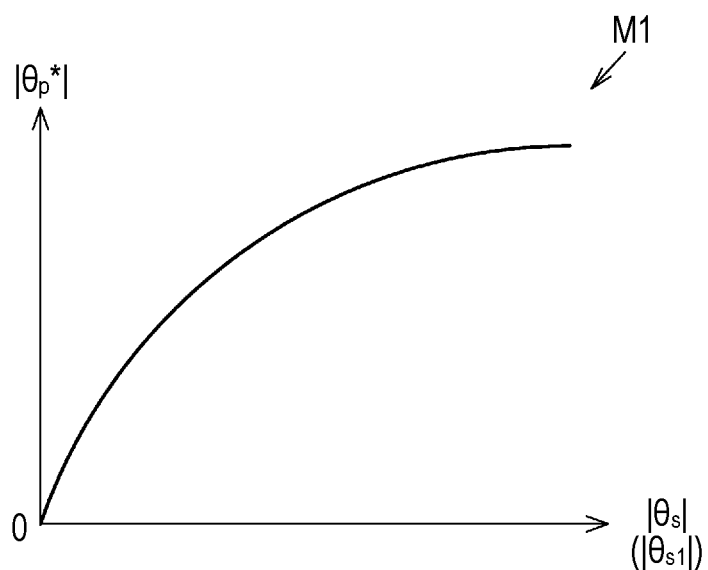
FIG. 3 is a graph illustrating a relationship between a steering angle and a target pinion angle according to the first embodiment.

The target pinion angle calculating unit 62 calculates the target pinion angle $θ_p*$ using a map M1 illustrated in the graph of FIG. 3. The map M1 is stored in a storage device of the control device 50. The map M1 is a two-dimensional map with the absolute value of the steering angle $θ_s$ on the horizontal axis and the absolute value of the target pinion angle $θ_p$ on the vertical axis and has the following characteristics. That is, the absolute value of the target pinion angle $θ_p*$ is set to a larger value as the absolute value of the steering angle $θ_s$ becomes larger. A slope which is a rate of change of the target pinion angle $θ_p*$ with respect to the steering angle $θ_s$ decreases gradually as the absolute value of the steering angle $θ_s$ increases. In other words, a characteristic line in FIG. 3 indicating a relationship between the absolute value of the steering angle $θ_s$ and the absolute value of the target pinion angle $θ_p*$ is a curve with a positive gradual decrease slope. The slope of the characteristic line in the graph of FIG. 3 indicates the steering angle ratio.

The target pinion angle calculating unit 62 may calculate the target pinion angle $θ_p$ based on a point of view of changing the steering angle ratio according to the vehicle speed V detected by the vehicle speed sensor 501. The target pinion angle calculating unit 62 calculates the target pinion angle $θ_p*$ such that the turning angle $θ_w$ with respect to the steering angle $θ_s$ becomes larger as the vehicle speed V becomes lower. When the vehicle enters a garage or the like at a low speed, a larger amount of vehicle turning with respect to the amount of steering of the steering wheel 11 is obtained, and thus handling performance of the vehicle is secured. The target pinion angle calculating unit 62 calculates the target pinion angle $θ_p$ such that the turning angle $θ_w$ with respect to the steering angle $θ_s$ becomes smaller as the vehicle speed V becomes higher. When lane change or the like is performed at a high speed, the amount of vehicle turning with respect to the amount of steering of the steering wheel 11 becomes smaller, and thus driving stability of the vehicle is secured.

As illustrated in FIG. 2, the pinion angle feedback control unit 63 receives the target pinion angle $θ_p*$ calculated by the target pinion angle calculating unit 62 and the actual pinion angle $θ_p$ calculated by the pinion angle calculating unit 61. The pinion angle feedback control unit 63 calculates a pinion angle command value $T_p*$ through feedback control for the pinion angle $θ_p$ such that the actual pinion angle $θ_p$ conforms to the target pinion angle $θ_p$.

The power supply control unit 64 supplies electric power corresponding to the pinion angle command value $T_p*$ to the turning motor 41. The power supply control unit 64 calculates a current command value for the turning motor 41 based on the pinion angle command value $T_p$. The power supply control unit 64 detects a value of an actual current $I_b$ flowing in a power supply path to the turning motor 41 using a current sensor 65 provided in the power supply path. The value of the current $I_b$ is a value of an actual current supplied to the turning motor 41. The power supply control unit 64 calculates a difference between the current command value and the value of the actual current $I_b$ and controls supply of electric power to the turning motor 41 such that the difference is cancelled (i.e., performs feedback control for the current $I_b$). Accordingly, the turning motor 41 rotates by an angle corresponding to the pinion angle command value $T_p*$.

Figure 4:
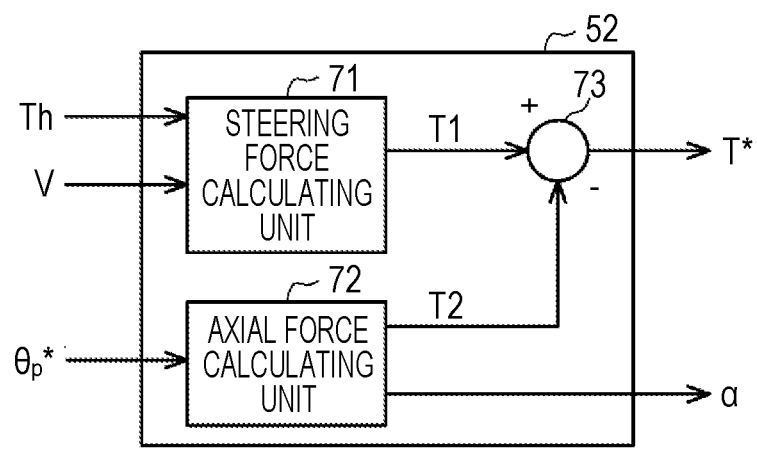
FIG. 4 is a block diagram illustrating a steering reaction force command value calculating unit according to the first embodiment.

The steering reaction force command value calculating unit 52 will be described below in detail. As illustrated in FIG. 4, the steering reaction force command value calculating unit 52 includes a steering force calculating unit 71, an axial force calculating unit 72, and a subtractor 73.

The steering force calculating unit 71 calculates a steering force T1 based on the steering torque $T_h$ and the vehicle speed V. The steering force T1 is a torque acting in the same direction as the steering direction of the steering wheel 11. The steering force T1 corresponds to an assist torque in a case where the steering system 10 is an electric power steering system. The assist torque is a force for assisting steering of the steering wheel 11. The steering force calculating unit 71 calculates the steering force T1 such that the absolute value thereof becomes larger as the absolute value of the steering torque $T_h$ becomes larger and as the vehicle speed V becomes lower.

The axial force calculating unit 72 receives the target pinion angle $θ_p$ calculated by the target pinion angle calculating unit 62. The axial force calculating unit 72 calculates an axial force acting on the turning shaft 14 based on the received target pinion angle $θ_p*$. The axial force calculating unit 72 calculates an axial torque T2 by converting the axial force calculated based on the target pinion angle $θ_p$ to a torque for the steering wheel 11 or the steering shaft 12.

Figure 5:
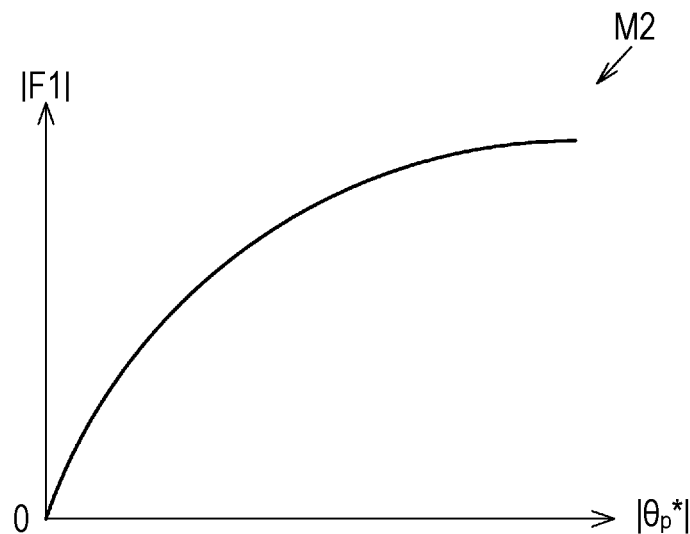
FIG. 5 is a graph illustrating a relationship between a target pinion angle and an angle axial force according to the first embodiment.

The axial force calculating unit 72 calculates an angle axial force F1, for example, using a map M2 illustrated in FIG. 5. The map M2 is stored in the storage device of the control device 50. The angle axial force F1 is an ideal value of the axial force acting on the turning shaft 14. The angle axial force F1 is an axial force in which a road surface state or a force acting on the turning shaft 14 from a road surface is not reflected.

As illustrated in the graph of FIG. 5, the map M2 is a two-dimensional map with the absolute value of the target pinion angle $\theta_p^*$ on the horizontal axis and with the absolute value of the angle axial force F1 on the vertical axis and has the following characteristics. That is, the absolute value of the angle axial force F1 is set to a larger value as the absolute value of the target pinion angle $\theta_p$ becomes larger. A slope which is a rate of change of the angle axial force F1 with respect to the target pinion angle $\theta_p$ decreases gradually as the absolute value of the target pinion angle $\theta_p^*$ increases. In other words, the characteristic line in FIG. 5 indicating the relationship between the absolute value of the target pinion angle $\theta_p^*$ and the absolute value of the angle axial force F1 is a curve with a positive gradual decrease slope. The angle axial force F1 is set to the same sign as the sign of the target pinion angle $\theta_p^*$.

The axial force calculating unit 72 calculates an axial torque T2 by converting the angle axial force F1 calculated using the map M2 to a torque. The subtractor 73 calculates the steering reaction force command value T* by subtracting the axial torque T2 calculated by the axial force calculating unit 72 from the steering force T1 calculated by the steering force calculating unit 71.

Securing of turning responsiveness and feeling of steering will be described. With the control device 50 having the aforementioned configuration, it is possible to apply a steering reaction corresponding to a steering state of the steering wheel 11 or a turning state of the turning wheels 16 to the steering wheel 11 by reflecting the steering force T1 and the axial torque T2 in the steering reaction force command value T*. Accordingly, a driver can ascertain a vehicle behavior by feeling the steering reaction force from the steering wheel 11 as a response.

With regard to the control device 50, there is a concern as follows. That is, the control device 50 may be requested to further improve responsiveness of the turning wheels 16 with respect to steering of the steering wheel 11 depending on product specifications or the like. Accordingly, it is conceivable that a compensation function for torsion of the torsion bar 34A is provided in the control device 50. Specifically, a torsion angle of the torsion bar 34A is added to the steering angle $\theta_s$ calculated by the steering angle calculating unit 51. This idea is based on the following point of view.

That is, the control device 50 calculates a steering angle $\theta_s$ based on the rotation angle $\theta_a$ of the reaction motor 31 and calculates a target pinion angle $\theta_p$ based on the calculated steering angle $\theta_s$. Accordingly, when the steering wheel 11 is steered, a phase delay of the target pinion angle $\theta_p^*$ with respect to a phase of the steering wheel 11 occurs by an amount of torsion of the torsion bar 34A. Since the target pinion angle $\theta_p^*$ is a control target value of the pinion angle $\theta_p$, a phase delay also occurs in turning of the turning wheels 16.

Therefore, by adding the torsion angle of the torsion bar 34A to the steering angle $\theta_s$ calculated by the steering angle calculating unit 51, the phase of the target pinion angle $\theta_p^*$ which is a control target value of the pinion angle $\theta_p$ can be advanced.

Accordingly, it is possible to curb a phase delay of the target pinion angle $\theta_p$ and a phase delay of the turning wheels 16 due to torsion of the torsion bar 34A. As a result, it is possible to improve turning responsiveness with respect to steering of the steering wheel 11.

However, the control device 50 controls the reaction motor 31 using the angle axial force F1 based on the target pinion angle $\theta_p^*$. Accordingly, a response of the steering reaction force with respect to steering of the steering wheel 11 is determined according to a response of the target pinion angle $\theta_p^*$. Accordingly, when the target pinion angle $\theta_p^*$ is adjusted such that turning responsiveness conforms to target responsiveness, setting of the target pinion angle $\theta_p^*$ influences the steering reaction force. The adjustment for achieving the target turning responsiveness may adversely affect the responsiveness of the steering reaction force.

For example, when the target pinion angle $\theta_p^*$ is adjusted by adding the torsion angle of the torsion bar 34A to the steering angle $\theta_s$ for the purpose of improvement of the turning responsiveness as described above, there is a concern that the responsiveness of the steering reaction force may be excessively high. Particularly, when the value of the target pinion angle $\theta_p^*$ is in an area in which the slope of the characteristic line in the map M2 illustrated in the graph of FIG. 5 is larger, the absolute value of the angle axial force F1 and the steering reaction force command value T* may change sharply. Accordingly, there is a concern that a feeling of steering of the steering wheel 11 may deteriorate and a driver may feel discomfort.

Figure 6:
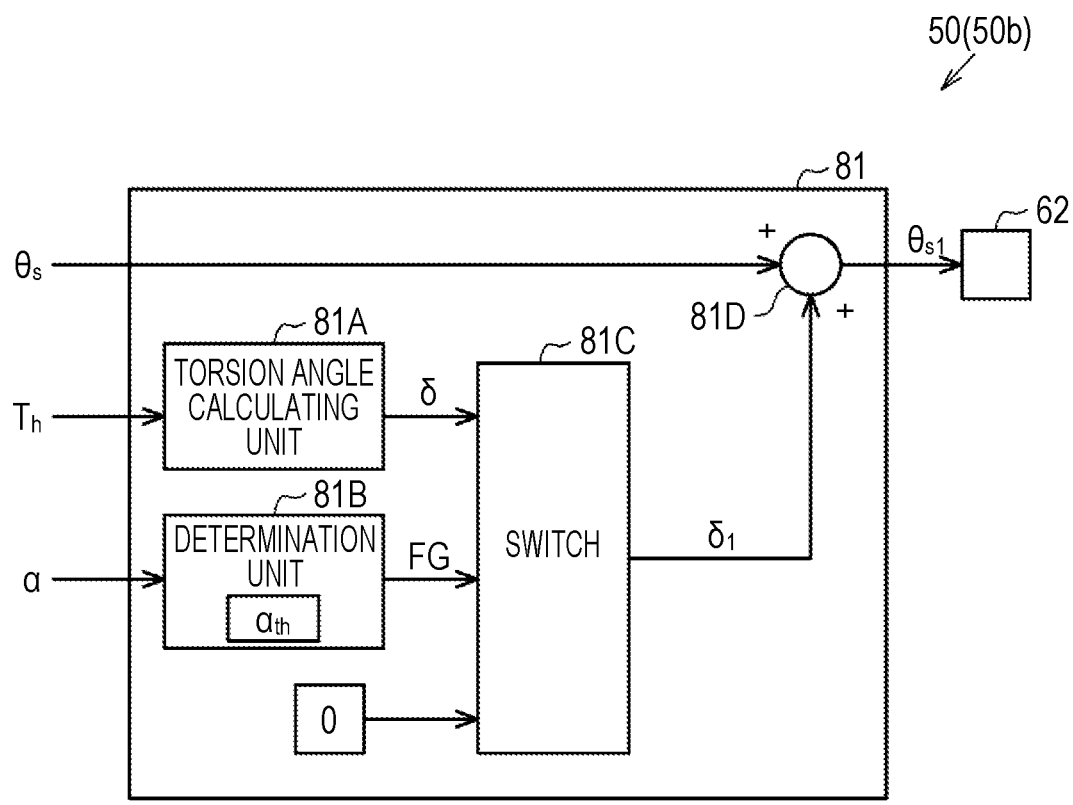
FIG. 6 is a block diagram illustrating a compensation value calculating unit according to the first embodiment.

Therefore, in this embodiment, the control device 50 has the following configuration. A compensation value calculating unit for the torsion angle will be described below. As illustrated in FIG. 6, the control device 50 includes a compensation value calculating unit 81. The compensation value calculating unit 81 is provided, for example, in the turning control unit 50b. The compensation value calculating unit 81 calculates a compensation value for compensating for the torsion angle of the torsion bar 34A.

The compensation value calculating unit 81 includes a torsion angle calculating unit 81A, a determination unit 81B, a switch 81C, and an adder 81D. The torsion angle calculating unit 81A calculates a torsion angle δ of the torsion bar 34A based on the steering torque $T_h$ detected by the torque sensor 34. The torsion angle calculating unit 81A calculates the torsion angle δ, for example, by multiplying the steering torque $T_h$ by a reciprocal of torsional rigidity of the torsion bar 34A.

The determination unit 81B determines whether the torsion angle δ of the torsion bar 34A is to be compensated for, that is, whether the torsion angle δ is to be added to the steering angle $\theta_s$. The determination unit 81B receives a slope α which is a rate of change of the angle axial force F1 with respect to the target pinion angle $\theta_p^*$ from the axial force calculating unit 72. The axial force calculating unit 72 calculates the slope α, for example, by dividing a change amount of the angle axial force F1 per unit time by a change amount of the target pinion angle $\theta_p$ per unit time.

The determination unit 81B determines whether the torsion angle δ of the torsion bar 34A is to be added to the steering angle $\theta_s$ by comparing the value of the slope α with a slope threshold value $\alpha_{th}$. A situation in which the torsion angle δ of the torsion bar 34A is to be added to the steering angle $\theta_s$ is, for example, a situation in which responsiveness of the steering reaction force is not excessively increased (i.e., the responsiveness of the steering reaction force does not become excessively high) and is maintained at an allowable level. That is, a situation in which the target pinion angle $\theta_p^*$ is adjusted by adding the torsion angle δ of the torsion bar 34A to the steering angle $\theta_s$ is a situation in which the absolute value of the angle axial force F1 and the steering reaction force command value T* are less likely to change sharply with respect to change of the adjusted target pinion angle $\theta_p^*$. In this situation, from a point of view of increasing the turning responsiveness, it is preferable to adjust the target pinion angle $\theta_p^*$ by adding the torsion angle $\delta$ of the torsion bar 34A to the steering angle $\theta_s$. The slope threshold value $\alpha_{th}$ is set, for example, by simulation. The slope threshold value $\alpha_{th}$ is set, for example, with reference to the slope $\alpha$ at a time when the target pinion angle $\theta_p^*$ is set to a value close to "0°" corresponding to a turning neutral position.

The determination unit 81B sets a value of a flag FG to "1" when the value of the slope $\alpha$ input from the axial force calculating unit 72 is equal to or less than the slope threshold value $\alpha_{th}$. The determination unit 81B sets the value of the flag FG to "0" when the value of the slope $\alpha$ input from the axial force calculating unit 72 is greater than the slope threshold value $\alpha_{th}$.

The switch 81C receives the torsion angle $\delta$ calculated by the torsion angle calculating unit 81A and "0" which is a fixed value stored in the storage device of the control device 50, as data inputs. The switch 81C receives the value of the flag FG set by the determination unit 81B as a control input. The switch 81C selects one of the torsion angle $\delta$ calculated by the torsion angle calculating unit 81A and "0" which is a fixed value, as a final torsion angle $\delta_1$ which is to be added to the steering angle $\theta_s$, based on the value of the flag FG. The switch 81C selects the torsion angle $\delta$ calculated by the torsion angle calculating unit 81A as the final torsion angle $\delta_1$ when the value of the flag FG is "1." The switch 81C selects "0" which is a fixed value as the final torsion angle $\delta_1$ when the value of the flag FG is "0." The final torsion angle $\delta_1$ is a compensation value for compensating for the torsion angle $\delta$ of the torsion bar 34A.

The adder 81D calculates a final steering angle $\theta_{s1}$ which is used to calculate the target pinion angle $\theta_p^*$ by adding the final torsion angle $\delta_1$ selected by the switch 81C to the steering angle $\theta_s$ calculated by the steering angle calculating unit 51. When the value of the slope $\alpha$ is equal to or less than the slope threshold value $\alpha_{th}$, that is, when the value of the flag FG is "1," the torsion angle $\delta$ calculated by the torsion angle calculating unit 81A is added as the final torsion angle $\delta_1$ to the steering angle $\theta$. When the value of the slope $\alpha$ is greater than the slope threshold value $\alpha_{th}$, that is, when the value of the flag FG is "0," "0" which is a fixed value is added as the final torsion angle $\delta_1$ to the steering angle $\theta$.

Operations of the first embodiment will be described below. As described above, when the value of the slope $\alpha$ is equal to or less than the slope threshold value $\alpha_{th}$, the target pinion angle $\theta_p^*$ is adjusted by adding the torsion angle $\delta$ of the torsion bar 34A to the steering angle $\theta_s$ calculated by the steering angle calculating unit 51. Accordingly, the phase of the target pinion angle $\theta_p^*$ which is a control target value of the pinion angle $\theta_p$ is advanced. Accordingly, it is possible to curb a phase delay of the target pinion angle $\theta_p^*$ due to the torsion of the torsion bar 34A, and thus it is possible to curb a phase delay of the turning wheels 16. As a result, the turning responsiveness to steering of the steering wheel 11 is improved.

When the value of the slope $\alpha$ is equal to or less than the slope threshold value $\alpha_{th}$, the responsiveness of the steering reaction force is less likely to become excessively high even if the target pinion angle $\theta_p^*$ is adjusted by adding the torsion angle $\delta$ of the torsion bar 34A to the steering angle $\theta_s$. Accordingly, it is possible to curb sharp change of the absolute value of the angle axial force F1 due to the change of the target pinion angle $\theta_p^*$ and thus it is possible to curb sharp change of the steering reaction force command value T* due to the change of the target pinion angle $\theta_p^*$.

Accordingly, a good feeling of steering is obtained from the steering wheel 11. A driver does not feel discomfort.

On the other hand, when the value of the slope $\alpha$ is greater than the slope threshold value $\alpha_{th}$, the responsiveness of the steering reaction force is more likely to become excessively high by adding the torsion angle $\delta$ of the torsion bar 34A to the steering angle $\theta_s$ to adjust the target pinion angle $\theta_p^*$. Accordingly, when the value of the slope $\alpha$ is greater than the slope threshold value $\alpha_{th}$, the torsion angle $\delta$ of the torsion bar 34A is not added to the steering angle $\theta_s$ calculated by the steering angle calculating unit 51. That is, the steering angle $\theta_s$ calculated by the steering angle calculating unit 51 is used as the final steering angle $\theta_{s1}$ without any change, to calculate the target pinion angle $\theta_p^*$. Accordingly, excessive increase of the responsiveness of the steering reaction force is curbed. It is possible to curb sharp change of the absolute value of the angle axial force F1 due to the change of the target pinion angle $\theta_p$, and thus, it is possible to curb sharp change of the steering reaction force command value T* due to the change of the target pinion angle $\theta_p^*$. Accordingly, a good feeling of steering is obtained from the steering wheel 11. A driver does not feel discomfort.

According to the first embodiment, the following advantageous effect can be achieved. (1) Whether the torsion angle $\delta$ of the torsion bar 34A is to be added to the steering angle $\theta_s$ is determined according to the slope $\alpha$ which is the rate of change of the angle axial force F1 with respect to the target pinion angle $\theta_p^*$. Accordingly, it is possible to secure a good feeling of steering and to improve the turning responsiveness to steering of the steering wheel 11.

Second Embodiment

A second embodiment in which a steering control device is applied to a steer-by-wire steering system will be described below. This embodiment basically has the same configuration as in the first embodiment described above with reference to FIGS. 1 to 5. This embodiment is different from the first embodiment in the configuration of the compensation value calculating unit 81. Accordingly, the same members and constituents as in the first embodiment will be referred to by the same reference signs and detailed description thereof will be omitted.

Figure 7:
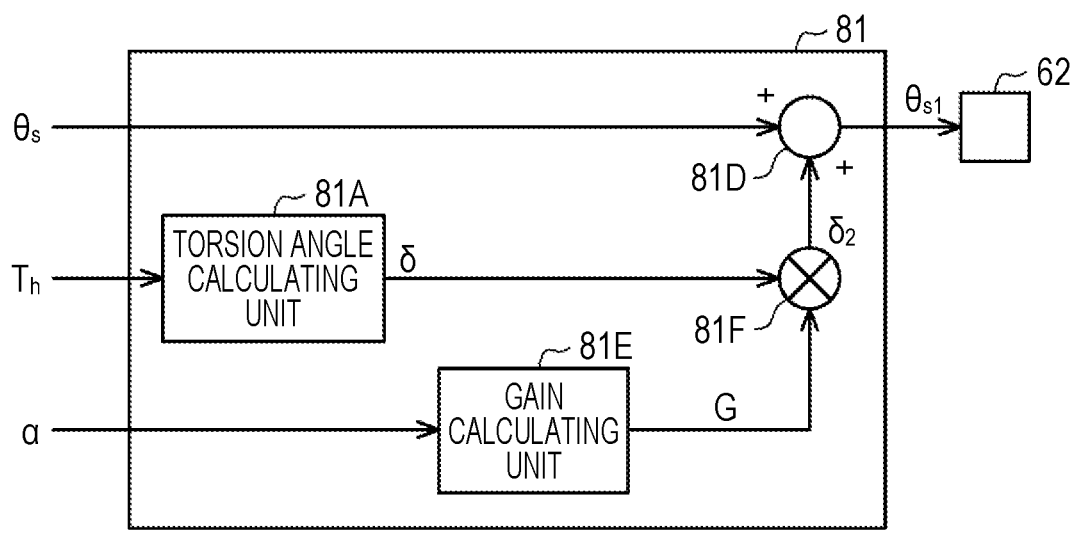
FIG. 7 is a block diagram illustrating a compensation value calculating unit according to a second embodiment.

As illustrated in FIG. 7, the compensation value calculating unit 81 includes a torsion angle calculating unit 81A, a gain calculating unit 81E, a multiplier 81F, and an adder 81D. The torsion angle calculating unit 81A calculates the torsion angle $\delta$ of the torsion bar 34A based on the steering torque $T_h$ detected by the torque sensor 34.

The gain calculating unit 81E receives the slope $\alpha$ which is a rate of change of the angle axial force F1 with respect to the target pinion angle $\theta_p^*$ from the axial force calculating unit 72. The gain calculating unit 81E calculates a gain G according to the slope $\alpha$. The gain calculating unit 81E calculates the gain G using a map M3 which is stored in the storage device of the control device 50. The map M3 is a two-dimensional map in which a relationship between the slope $\alpha$ and the gain G is defined and has the following characteristics.

Figure 8:
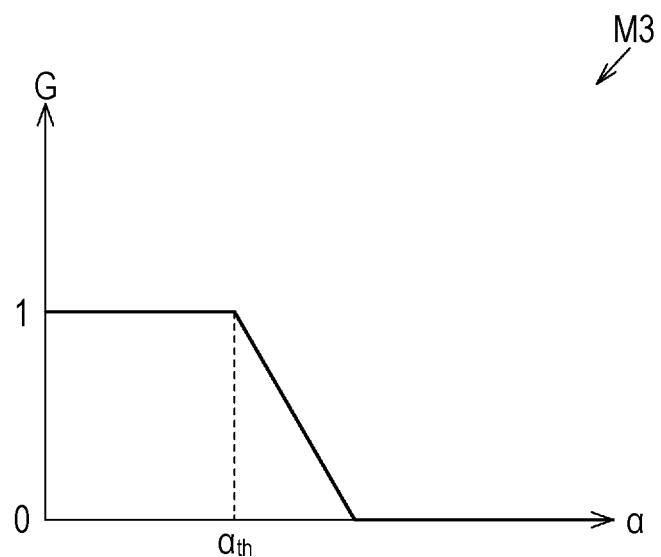
FIG. 8 is a graph illustrating a relationship between a slope which is a rate of change of an angle axial force with respect to a target pinion angle and a gain according to the second embodiment.

That is, when the slope $\alpha$ is equal to or less than the slope threshold value $\alpha_{th}$ as illustrated in the graph of FIG. 8, the value of the gain G is maintained at "1." When the value of the slope $\alpha$ is greater than the slope threshold value $\alpha_{th}$, the value of the gain G decreases gradually to "0" and then reaches "0" as the value of the slope $\alpha$ increases. After the value of the gain G has reached "0," the value of the gain G is maintained at "0" regardless of the increase of the value of the slope α. The gain G can be set to change, for example, in steps of "0.1" in a range of "0" to "1."

The multiplier 81F calculates a final torsion angle $\delta_2$ by multiplying the torsion angle δ of the torsion bar 34A calculated by the torsion angle calculating unit 81A by the gain G calculated by the gain calculating unit 81E. When the slope α is equal to or less than the slope threshold value $\alpha_{th}$, the value of the gain G is set to "1." Accordingly, the torsion angle δ calculated by the torsion angle calculating unit 81A is used as the final torsion angle $\delta_2$ without any change. When the value of the slope α is greater than the slope threshold value $\alpha_{th}$, the value of the gain G is set to a value less than "1" or "0" according to the value of the slope α. Accordingly the value of the final torsion angle $\delta_2$ is a value less than the torsion angle δ calculated by the torsion angle calculating unit 81A, or "0."

The adder 81D calculates a final steering angle $\theta_{sf}$ which is used to calculate the target pinion angle $\theta_p$ by adding the final torsion angle $\delta_2$ calculated by the multiplier 81F to the steering angle $\theta_s$ calculated by the steering angle calculating unit 51. When the value of the slope α is equal to or less than the slope threshold value $\alpha_{th}$, the torsion angle δ calculated by the torsion angle calculating unit 81A is added as the final torsion angle $\delta_2$ to the steering angle θ. When the value of the slope α is greater than the slope threshold value $\alpha_{th}$, a value less than the torsion angle δ calculated by the torsion angle calculating unit 81A or "0" is added as the final torsion angle $\delta_2$ to the steering angle $\theta_s$.

According to the second embodiment, the following advantageous effect can be achieved. (2) The value of the torsion angle δ of the torsion bar 34A which is added to the steering angle $\theta_s$ changes according to the slope α which is a rate of change of the angle axial force F1 with respect to the target pinion angle $\theta_p$. That is, a degree of reflection of the torsion angle δ of the torsion bar 34A in the steering angle $\theta_s$ changes according to the slope α. Accordingly, it is possible to secure a good feeling of steering and to improve turning responsiveness with respect to steering of the steering wheel 11.

Third Embodiment

A third embodiment in which a steering control device is applied to a steer-by-wire steering system will be described below. This embodiment basically has the same configuration as in the first embodiment described above with reference to FIGS. 1 to 5. This embodiment is different from the first embodiment in the configuration of the axial force calculating unit 72 and the compensation value calculating unit 81. Accordingly, the same members and constituents as in the first embodiment will be referred to by the same reference signs and detailed description thereof will be omitted.

Figure 9:
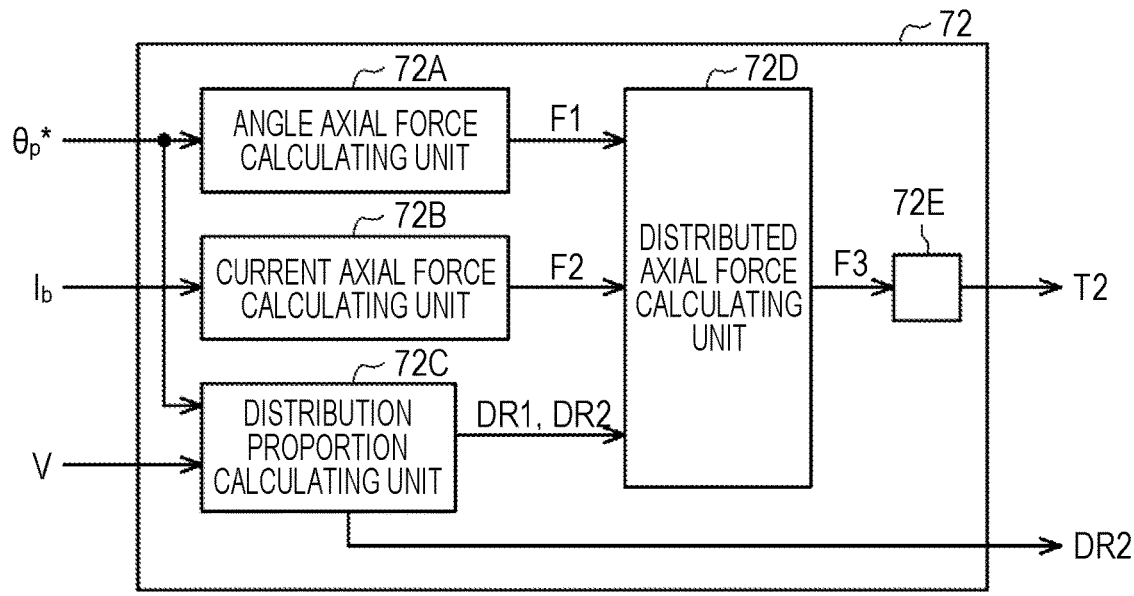
FIG. 9 is a block diagram illustrating an axial force calculating unit according to a third embodiment.

As illustrated in FIG. 9, the axial force calculating unit 72 includes an angle axial force calculating unit 72A, a current axial force calculating unit 72B, a distribution proportion calculating unit 72C, a distributed axial force calculating unit 72D, and a converter 72E. The angle axial force calculating unit 72A calculates an angle axial force F1 based on a target pinion angle $\theta_p$ calculated by the target pinion angle calculating unit 62. The angle axial force calculating unit 72A calculates the angle axial force F1 using the map M2 described above with reference to FIG. 5.

The current axial force calculating unit 72B calculates a current axial force F2 based on a value of a current $I_b$ of the turning motor 41. The current axial force is an estimated value of an axial force based on the value of the current $I_b$. The value of the current $I_b$ of the turning motor 41 changes according to a difference between the target pinion angle $\theta_p^*$ and the actual pinion angle $\theta_p$, for the reason that disturbance based on a road surface state such as road frictional resistance is applied to the turning wheels 16.

That is, an actual road surface state is reflected in the value of the current $I_b$ of the turning motor 41. Accordingly, it is possible to calculate an axial force in which an influence of the road surface state is reflected, based on the value of the current $I_b$ of the turning motor 41. The current axial force F2 is calculated, for example, by multiplying the value of the current $I_b$ of the turning motor 41 by a gain which is a predetermined coefficient. The current axial force F2 is an axial force in which a road surface state or a force acting on the turning shaft 14 via the turning wheels 16 is reflected.

The distribution proportion calculating unit 72C calculates a distribution proportion DR1 of the angle axial force F1 and a distribution proportion DR2 of the current axial force F2 based on the target pinion angle $\theta_p^*$ calculated by the target pinion angle calculating unit 62 and the vehicle speed V detected by the vehicle speed sensor 501. The distribution proportion calculating unit 72C can set the values of the two distribution proportions DR1 and DR2 such that the values of the two distribution proportions DR1 and DR2 change, for example, in steps of "0.1" in a range of "0" to "1", based on product specifications or the like. The distribution proportion calculating unit 72C sets the values of the two distribution proportions DR1 and DR2 such that the sum of the two distribution proportions DR1 and DR2 is "1."

For example, the distribution proportion calculating unit 72C sets the distribution proportion DR1 of the angle axial force F1 to a smaller value and sets the distribution proportion DR2 of the current axial force F2 to a larger value as the absolute value of the target pinion angle $\theta_p$ becomes larger. That is, the distribution proportion calculating unit 72C sets the distribution proportion DR1 of the angle axial force F1 to a larger value and sets the distribution proportion DR2 of the current axial force F2 to a smaller value as the absolute value of the target pinion angle $\theta_p$ becomes smaller.

For example, the distribution proportion calculating unit 72C sets the distribution proportion DR1 of the angle axial force F1 to a larger value and sets the distribution proportion DR2 of the current axial force F2 to a smaller value as the vehicle speed V becomes higher. That is, the distribution proportion calculating unit 72C sets the distribution proportion DR1 of the angle axial force F1 to a smaller value and sets the distribution proportion DR2 of the current axial force F2 to a larger value as the vehicle speed V becomes lower.

The distributed axial force calculating unit 72D calculates a distributed axial force F3 by multiplying the angle axial force F1 by the individually set distribution proportion DR1, multiplying the current axial force F2 by the individually set distribution proportion DR2, and summing the multiplied values. The distributed axial force F3 is a final axial force which is reflected in the steering reaction force command value T*. The distribution proportion DR1 is also a value indicating a degree of reflection of the angle axial force F1 in the distributed axial force F3. The distribution proportion DR2 is also a value indicating a degree of reflection of the current axial force F2 in the distributed axial force F3.

The converter 72E calculates an axial torque T2 by converting the distributed axial force F3 calculated by the distributed axial force calculating unit 72D to a torque for the steering wheel 11 or the steering shaft 12.

With the control device 50 having the aforementioned configuration, since the axial torque T2 obtained by converting the distributed axial force F3 calculated by the axial force calculating unit 72 to a torque is reflected in the steering reaction force command value T*, it is possible to apply a steering reaction force corresponding to vehicle behavior or a road surface state to the steering wheel 11. Accordingly, a driver can ascertain the vehicle behavior or the road surface state by feeling the steering reaction force from the steering wheel 11 as a response.

Figure 10:
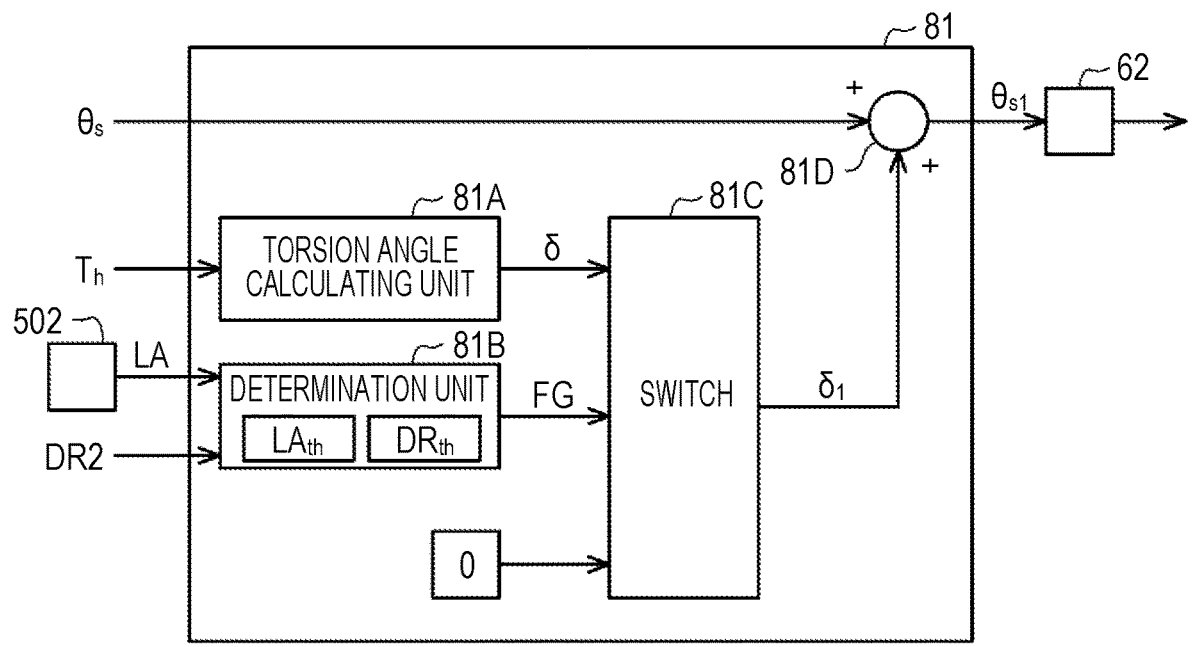
FIG. 10 is a block diagram illustrating a compensation value calculating unit according to the third embodiment.

As illustrated in FIG. 10, similarly to the first embodiment, the compensation value calculating unit 81 includes a torsion angle calculating unit 81A, a determination unit 81B, a switch 81C, and an adder 81D. Here, a determination process which is performed by the determination unit 81B is different from that in the first embodiment.

The determination unit 81B indirectly determines whether the value of the slope α which is a rate of change of the angle axial force F1 with respect to the target pinion angle $\theta_p^*$ is greater than, for example, the slope threshold value $\alpha_{th}$. Here, it should be noted that the value of the slope α is greater than the slope threshold value $\alpha_{th}$ when both the following two conditions (A1) and (A2) are satisfied.

(A1) The axial force acting on the turning shaft 14 has a value close to "0." (A2) The vehicle is in a stopped state, that is, the vehicle speed V has a value close to "0." The determination unit 81B determines whether the two conditions (A1) and (A2) are satisfied based on a lateral acceleration LA and the distribution proportion DR2 of the current axial force F2 and determines whether the torsion angle δ of the torsion bar 34A is to be compensated for based on the determination result.

The lateral acceleration LA is an acceleration at a time when the vehicle turns and is detected by an onboard lateral acceleration sensor 502. There is a correlation between the lateral acceleration LA and the axial force acting on the turning shaft 14. For example, the axial force acting on the turning shaft 14 increases as the lateral acceleration LA increases. On the other hand, the axial force acting on the turning shaft 14 decreases as the lateral acceleration LA decreases. Accordingly, it is possible to recognize the magnitude of the axial force acting on the turning shaft 14 from the lateral acceleration LA.

The distribution proportion DR2 is set according to the vehicle speed V. For example, the distribution proportion DR2 of the current axial force F2 is set to a larger value as the vehicle speed V becomes lower. The distribution proportion DR2 of the current axial force F2 is set to a smaller value as the vehicle speed V becomes higher. Accordingly, it is possible to recognize the magnitude of the vehicle speed V from the distribution proportion DR2.

The determination unit 81B receives the lateral acceleration LA detected by the onboard lateral acceleration sensor 502 and the distribution proportion DR2 calculated by the distribution proportion calculating unit 72C. The determination unit 81B determines whether the condition (A1) is satisfied by comparing the lateral acceleration LA with a lateral acceleration threshold value $LA_{th}$. The lateral acceleration threshold value $LA_{th}$ is set, for example, by simulation. For example, the lateral acceleration threshold value $LA_{th}$ is set with reference to the lateral acceleration LA at a time when the axial force acting on the turning shaft 14 has a value close to "0."

When the value of the lateral acceleration LA is larger than the lateral acceleration threshold value $LA_{th}$, the determination unit 81B determines that the value of the axial force acting on the turning shaft 14 is not close to "0," that is, that the condition (A1) is not satisfied. On the other hand, when the value of the lateral acceleration LA is equal to or less than the lateral acceleration threshold value $LA_{th}$, the determination unit 81B determines that the value of the axial force acting on the turning shaft 14 is close to "0," that is, that the condition (A1) is satisfied.

The determination unit 81B determines whether the condition (A2) is satisfied by comparing the distribution proportion DR2 of the current axial force F2 with a distribution proportion threshold value $DR_{th}$. The distribution proportion threshold value $DR_{th}$ is set, for example, with reference to the distribution proportion DR2 at a time when the value of the vehicle speed V is "0." The distribution proportion threshold value $DR_{th}$ is set to, for example, "1" or a value slightly less than "1."

When the value of the distribution proportion DR2 of the current axial force F2 is equal to or less than the distribution proportion threshold value $DR_{th}$, the determination unit 81B determines that the vehicle is not in the stopped state, that is, that the condition (A2) is not satisfied. On the other hand, when the value of the distribution proportion DR2 of the current axial force F2 is greater than the distribution proportion threshold value $DR_{th}$, the determination unit 81B determines that the vehicle is in the stopped state, that is, that the condition (A2) is satisfied.

When at least one of the two conditions (A1) and (A2) is not satisfied, the determination unit 81B sets the value of the flag FG to "1." When both of the two conditions (A1) and (A2) are satisfied, the determination unit 81B sets the value of the flag FG to "0."

When the value of the flag FG is "1," the switch 81C selects the torsion angle δ calculated by the torsion angle calculating unit 81A, as a final torsion angle $\delta_1$. When the value of the flag FG is "0," the switch 81C selects "0" which is a fixed value, as the final torsion angle $\delta_1$.

The adder 81D calculates a final steering angle $\theta_{sl}$ by summing the steering angle $\theta_s$ calculated by the steering angle calculating unit 51 and the final torsion angle $\delta_1$ selected by the switch 81C. When the value of the flag FG is "1," the torsion angle δ calculated by the torsion angle calculating unit 81A is added as the final torsion angle $\delta_1$ to the steering angle θ. When the value of the flag FG is "0," "0" which is a fixed value is added as the final torsion angle $\delta_1$ to the steering angle θ.

According to the third embodiment, the following advantageous effect can be achieved. (3) Whether the value of the slope α is greater than the slope threshold value $\alpha_{th}$ is determined based on the lateral acceleration LA and the distribution proportion DR2 of the current axial force F2, and whether the torsion angle δ of the torsion bar 34A is to be added to the steering angle $\theta_s$ is determined based on the determination result. Accordingly, it is possible to secure a good feeling of steering and to improve turning responsiveness to steering of the steering wheel 11.

A configuration in which the determination unit 81B does not consider the lateral acceleration LA may be employed depending on product specifications or the like. In this case, the determination unit 81B determines whether the torsion angle δ of the torsion bar 34A is to be added to the steering angle $\theta_s$ based on only the distribution proportion DR2 of the current axial force F2 having a correlation with the axial force gradient. With this configuration as well, sharp change of the steering reaction force command value T* due to addition of the torsion angle δ to the steering angle $\theta_s$ is curbed.

Fourth Embodiment

A fourth embodiment in which a steering control device is applied to a steer-by-wire steering system will be described below. This embodiment basically has the same configuration as in the third embodiment described above with reference to FIG. 9. This embodiment is different from the third embodiment in the configuration of the compensation value calculating unit 81. Accordingly, the same members and constituents as in the third embodiment will be referred to by the same reference signs and detailed description thereof will be omitted.

Figure 11:
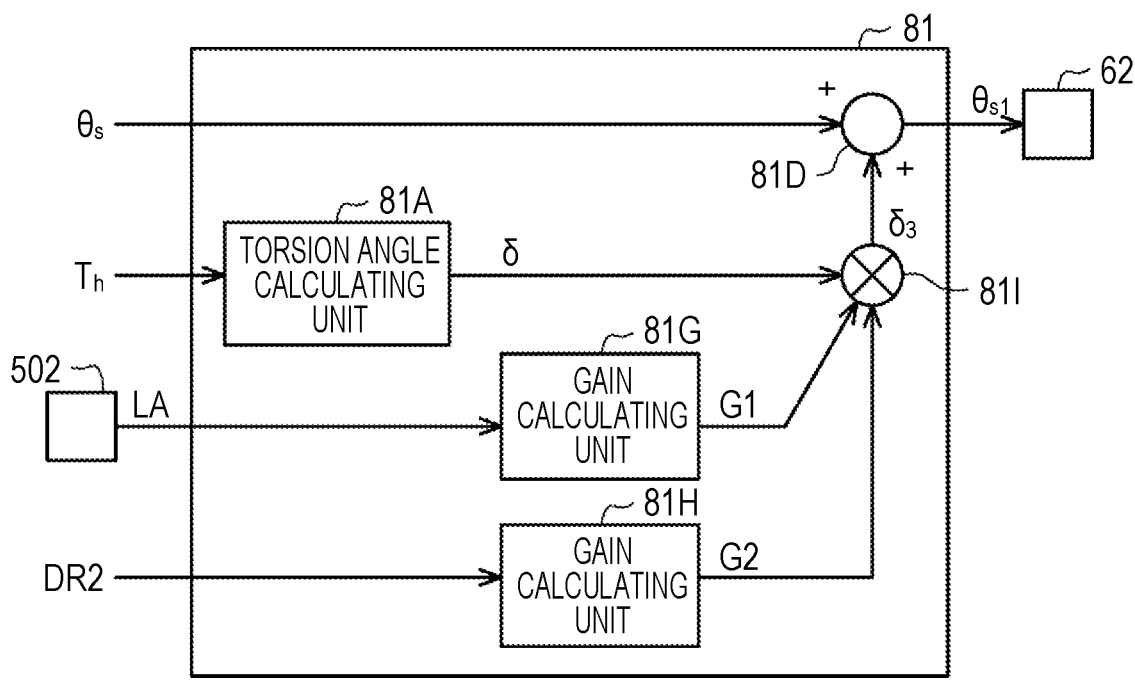
FIG. 11 is a block diagram illustrating a compensation value calculating unit according to a fourth embodiment.

As illustrated in FIG. 11, the compensation value calculating unit 81 includes a torsion angle calculating unit 81A, two gain calculating units 81G and 81H, a multiplier 811, and an adder 81D. The torsion angle calculating unit 81A calculates the torsion angle δ of the torsion bar 34A based on the steering torque $T_h$ detected by the torque sensor 34.

The gain calculating unit 81G receives the lateral acceleration LA detected by the lateral acceleration sensor 502. The gain calculating unit 81G calculates a gain G1 according to the lateral acceleration LA. The gain calculating unit 81G calculates the gain G1 using a map M4 which is stored in the storage device of the control device 50. The map M4 is a two-dimensional map in which a relationship between the absolute value of the lateral acceleration LA and the gain G1 is defined and has the following characteristics.

Figure 12:
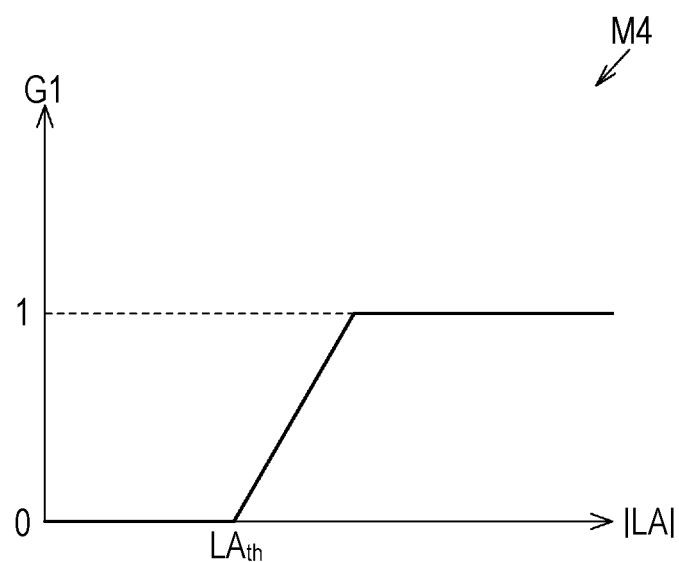
FIG. 12 is a graph illustrating a relationship between a lateral acceleration and a gain according to the fourth embodiment.

That is, as illustrated in the graph of FIG. 12, when the absolute value of the lateral acceleration LA is equal to or less than the lateral acceleration threshold value $LA_{th}$, the value of the gain G1 is maintained at "0." When the absolute value of the lateral acceleration LA is greater than the lateral acceleration threshold value $LA_{th}$, the value of the gain G1 increases gradually to "1" and then reaches "1" as the absolute value of the lateral acceleration LA increases. After the value of the gain G1 has reached to "1," the value of the gain G1 is maintained at "1" regardless of an increase of the absolute value of the lateral acceleration LA. The gain G1 can be set, for example, in units of "0.1" in a range of "0" to "1."

The gain calculating unit 81H receives the distribution proportion DR2 of the current axial force F2 calculated by the distribution proportion calculating unit 72C. The gain calculating unit 81H calculates a gain G2 according to the distribution proportion DR2. The gain calculating unit 81H calculates the gain G2 using a map M5 which is stored in the storage device of the control device 50. The map M5 is a two-dimensional map in which a relationship between the distribution proportion DR2 and the gain G2 is defined and has the following characteristics.

Figure 13:
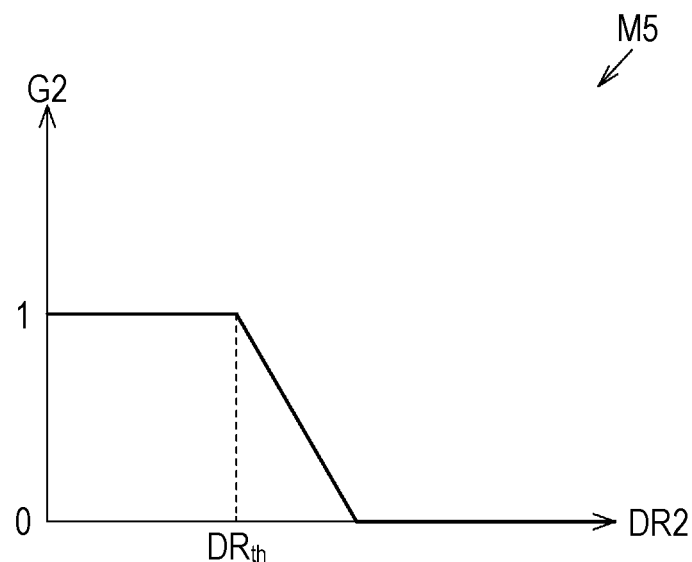
FIG. 13 is a graph illustrating a relationship between a distribution proportion of a current axial force and a gain according to the fourth embodiment.

That is, as illustrated in the graph of FIG. 13, when the value of the distribution proportion DR2 is equal to or less than the distribution proportion threshold value $DR_{th}$, the value of the gain G2 is maintained at "1." The distribution proportion threshold value $DR_{th}$ is set to a value slightly smaller than "1" which is the maximum value of the distribution proportion DR2. When the value of the distribution proportion DR2 is greater than the distribution proportion threshold value $DR_{th}$, the value of the gain G2 decreases gradually to "0" and then reaches "0" as the value of the distribution proportion DR2 increases. After the value of the gain G2 has reached "0," the value of the gain G2 is maintained at "0" regardless of the increase of the value of the distribution proportion DR2. The gain G2 can be set to change, for example, in steps of "0.1" in a range of "0" to "1."

As illustrated in FIG. 11, the multiplier 811 calculates the final torsion angle $\delta_3$ by multiplying the torsion angle δ calculated by the torsion angle calculating unit 81A, by the gain G1 calculated by the gain calculating unit 81G, and the gain G2 calculated by the gain calculating unit 81H.

When both of the values of the two gains G1 and G2 are "1," the torsion angle δ calculated by the torsion angle calculating unit 81A is used as the final torsion angle $\delta_3$ without any change. When both of the values of the two gains G1 and G2 are greater than "0" and at least one of the values of the two gains G1 and G2 is less than "1," the value of the final torsion angle $\delta_3$ is less than the torsion angle δ calculated by the torsion angle calculating unit 81A. When the value of at least one of the two gains G1 and G2 is "0," the value of the final torsion angle $\delta_3$ is "0."

The adder 81D calculates the final steering angle $\theta_{s1}$ used to calculate the target pinion angle $\theta_p^*$ by summing the steering angle $\theta_s$ calculated by the steering angle calculating unit 51 and the final torsion angle $\delta_3$ calculated by the multiplier 811.

According to the fourth embodiment, the following advantageous effect can be achieved. (4) The value of the torsion angle δ of the torsion bar 34A which is added to the steering angle $\theta_s$ changes according to the lateral acceleration LA and the distribution proportion DR2 of the current axial force F2, the lateral acceleration LA and the current axial force F2 having a correlation with the axial force gradient. That is, a degree of reflection of the torsion angle δ of the torsion bar 34A in the steering angle $\theta_s$ changes according to the lateral acceleration LA and the distribution proportion DR2 of the current axial force F2. Accordingly, it is possible to secure a good feeling of steering and to improve turning responsiveness to steering of the steering wheel 11.

Fifth Embodiment

A fifth embodiment in which a steering control device is applied to a steer-by-wire steering system will be described below. This embodiment basically has the same configuration as in the first embodiment described above with reference to FIGS. 1 to 5. This embodiment is different from the first embodiment in the configuration of the compensation value calculating unit 81. Accordingly, the same members and constituents as in the first embodiment will be referred to by the same reference signs and detailed description thereof will be omitted.

In this embodiment, it is noted that the absolute value of the target pinion angle $\theta_p^*$ and the steering reaction force command value T* may change more sharply when the value of the steering angle $\theta_s$ is in an area in which the slope of the characteristic line of the map M1 illustrated in FIG. 3 is larger.

Figure 14:
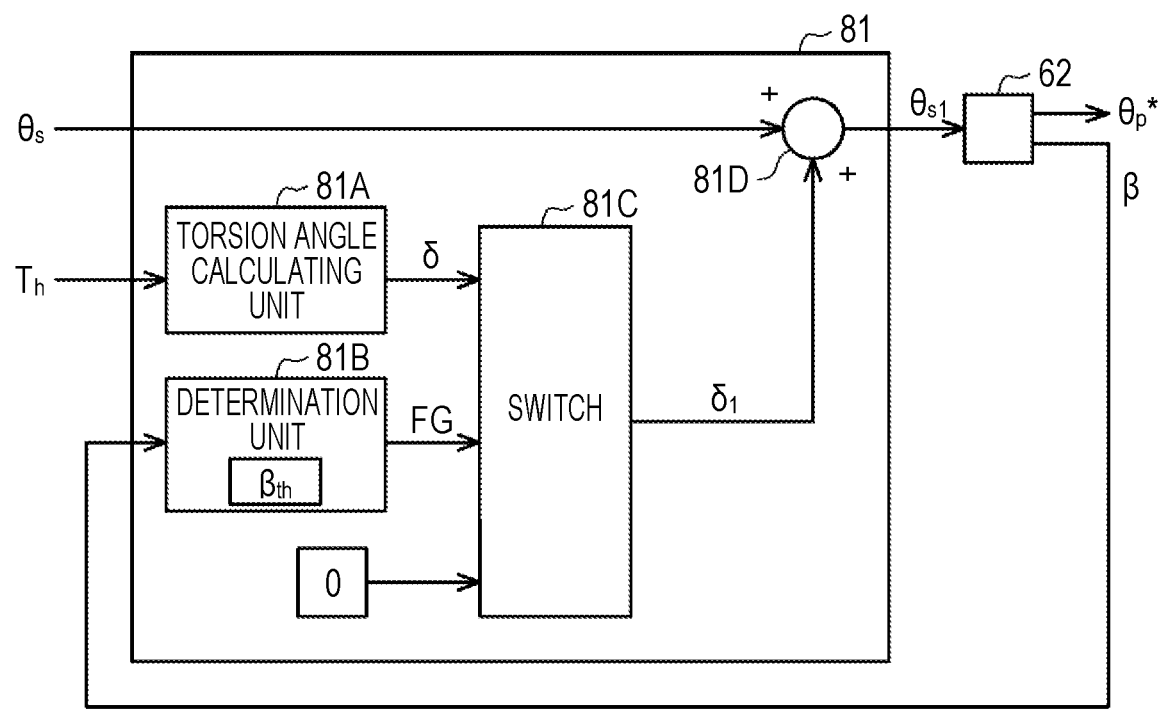
FIG. 14 is a block diagram illustrating a compensation value calculating unit according to a fifth embodiment.

As illustrated in FIG. 14, similarly to the first embodiment, the compensation value calculating unit 81 includes a torsion angle calculating unit 81A, a determination unit 81B, a switch 81C, and an adder 81D. Here, a determination process which is performed by the determination unit 81B is different from that in the first embodiment.

The torsion angle calculating unit 81A calculates the torsion angle δ of the torsion bar 34A based on the steering torque $T_h$ detected by the torque sensor 34. The determination unit 81B determines whether the torsion angle δ of the torsion bar 34A is to be compensated for, that is, whether the torsion angle δ is to be added to the steering angle $\theta_s$. The determination unit 81B receives a slope β which is a rate of change of the target pinion angle $\theta_p^*$ with respect to the steering angle $\theta_s$ from the target pinion angle calculating unit 62. The target pinion angle calculating unit 62 calculates the slope β, for example, by dividing a change amount of the target pinion angle $\theta_p$ per unit time by a change amount of the steering angle $\theta_s$ per unit time.

The determination unit 81B determines whether the torsion angle δ of the torsion bar 34A is to be added to the steering angle $θ_s$ by comparing the value of the slope β with a slope threshold value $β_{th}$. The slope threshold value $β_{th}$ is set, for example, by simulation. For example, the slope threshold value $β_{th}$ is set with reference to the slope β at a time when the value of the steering angle $θ_s$ is close to "0°" corresponding to a steering neutral position.

When the value of the slope β input from the target pinion angle calculating unit 62 is equal to or less than the slope threshold value $β_{th}$, the determination unit 81B sets the value of the flag FG to "1." When the value of the slope β input from the target pinion angle calculating unit 62 is greater than the slope threshold value $β_{th}$, the determination unit 81B sets the value of the flag FG to "0."

When the value of the flag FG is "1," the switch 81C selects the torsion angle δ calculated by the torsion angle calculating unit 81A, as the final torsion angle $δ_1$. When the value of the flag FG is "0," the switch 81C selects "0" which is a fixed value, as the final torsion angle $δ_1$.

The adder 81D calculates the final steering angle $θ_{s1}$ which is used to calculate the target pinion angle $θ_p$ by summing the steering angle $θ_s$ calculated by the steering angle calculating unit 51 and the final torsion angle $δ_1$ selected by the switch 81C.

According to the fifth embodiment, the following advantageous effect can be achieved. (5) Whether the torsion angle δ of the torsion bar 34A is to be added to the steering angle $θ_s$ is determined according to the slope β which is a rate of change of the target pinion angle $θ_p^*$ with respect to the steering angle $θ_s$. Accordingly, it is possible to secure a good feeling of steering and to improve turning responsiveness to steering of the steering wheel 11.

Sixth Embodiment

A sixth embodiment in which a steering control device is applied to a steer-by-wire steering system will be described below. This embodiment basically has the same configuration as in the fifth embodiment. This embodiment is different from the fifth embodiment in the configuration of the compensation value calculating unit 81. Accordingly, the same members and constituents as in the fifth embodiment will be referred to by the same reference signs and detailed description thereof will be omitted.

Figure 15:
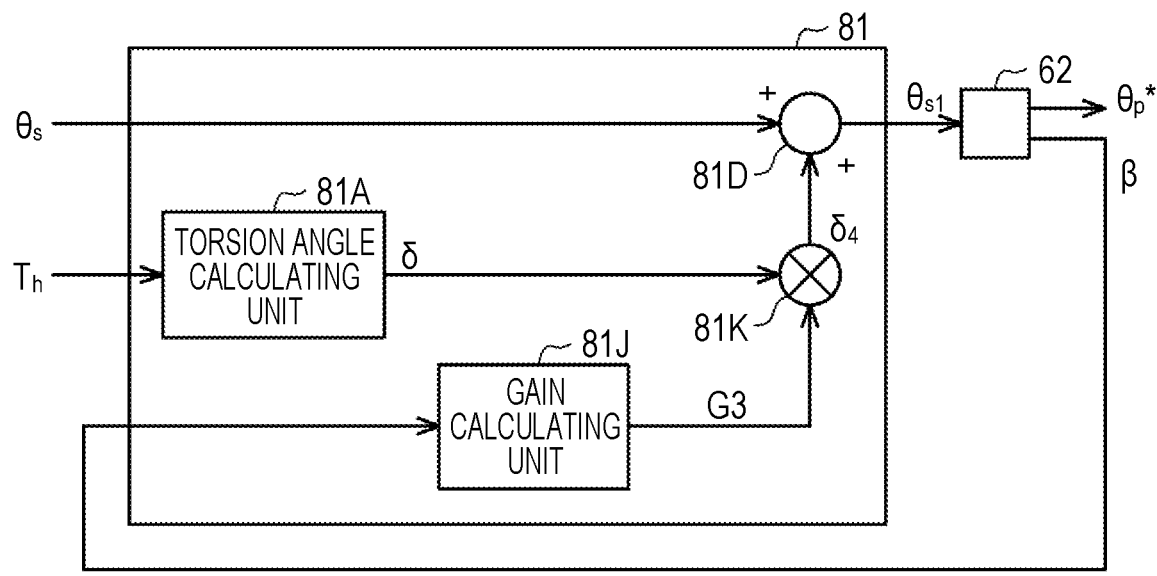
FIG. 15 is a block diagram illustrating a compensation value calculating unit according to a sixth embodiment.

As illustrated in FIG. 15, the compensation value calculating unit 81 includes a torsion angle calculating unit 81A, a gain calculating unit 81J, a multiplier 81K, and an adder 81D. The torsion angle calculating unit 81A calculates the torsion angle δ of the torsion bar 34A based on the steering torque $T_h$ detected by the torque sensor 34.

The gain calculating unit 81J receives the slope β which is a rate of change of the target pinion angle $θ_p^*$ with respect to the steering angle $θ_s$ from the target pinion angle calculating unit 62. The gain calculating unit 81J calculates a gain G3 according to the slope β. The gain calculating unit 81J calculates the gain G3 using a map M6 which is stored in the storage device of the control device 50. The map M6 is a two-dimensional map in which a relationship between the slope β and the gain G3 is defined and has the following characteristics.

Figure 16:
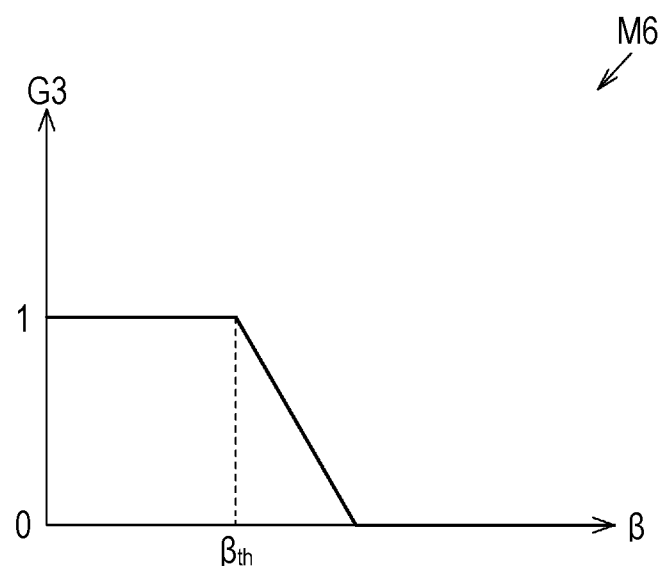
FIG. 16 is a graph illustrating a relationship between a slope which is a rate of change of a target pinion angle with respect to a steering angle and a gain according to the sixth embodiment.

That is, as illustrated in the graph of FIG. 16, when the value of the slope β is equal to or less than the slope threshold value $β_{th}$, the value of the gain G3 is maintained at "1." When the value of the slope β is greater than the slope threshold value $β_{th}$, the value of the gain G3 decreases gradually to "0" and then reaches "0" as the value of the slope β increases. After the value of the gain G3 has reached "0," the value of the gain G3 is maintained at "0" regardless of the increase of the value of the slope β. The gain G3 can be set to change, for example, in steps of "0.1" in a range of "0" to "1."

The multiplier 81K calculates a final torsion angle $δ_4$ by multiplying the torsion angle δ of the torsion bar 34A calculated by the torsion angle calculating unit 81A by the gain G3 calculated by the gain calculating unit 81J. When the value of the slope β is equal to or less than the slope threshold value $β_{th}$, the value of the gain G3 is set to "1." Accordingly, the torsion angle δ calculated by the torsion angle calculating unit 81A is used as the final torsion angle $δ_4$ without any change. When the value of the slope β is greater than the slope threshold value $β_{th}$, the value of the gain G3 is set to a value less than "1" or "0" according to the value of the slope β. Accordingly, the value of the final torsion angle $δ_4$ is a value less than the torsion angle δ calculated by the torsion angle calculating unit 81A, or "0."

The adder 81D calculates the final steering angle $θ_{s1}$ which is used to calculate the target pinion angle $θ_p$ by summing the steering angle $θ_s$ calculated by the steering angle calculating unit 51 and the final torsion angle $δ_4$ calculated by the multiplier 81K. When the value of the slope β is equal to or less than the slope threshold value $β_{th}$, the torsion angle δ calculated by the torsion angle calculating unit 81A is added as the final torsion angle $δ_4$ to the steering angle θ. When the value of the slope β is greater than the slope threshold value $β_{th}$, a value less than the torsion angle δ calculated by the torsion angle calculating unit 81A or "0" is added as the final torsion angle $δ_4$ to the steering angle $θ_s$.

According to the sixth embodiment, the following advantageous effect can be achieved. (6) The value of the torsion angle δ of the torsion bar 34A which is added to the steering angle $θ_s$ is changed according to the slope β which is a rate of change of the target pinion angle $θ_p$ with respect to the steering angle $θ_s$. That is, the degree of reflection of the torsion angle δ of the torsion bar 34A in the steering angle $θ_s$ is changed according to the slope β. Accordingly, it is possible to secure a good feeling of steering and to improve turning responsiveness to steering of the steering wheel 11.

Seventh Embodiment

A seventh embodiment in which a steering control device is applied to a steer-by-wire steering system will be described below. This embodiment is different from the fourth embodiment in the configuration of the compensation value calculating unit 81. Accordingly, the same members and constituents as in the fourth embodiment will be referred to by the same reference signs and detailed description thereof will be omitted.

Figure 17:
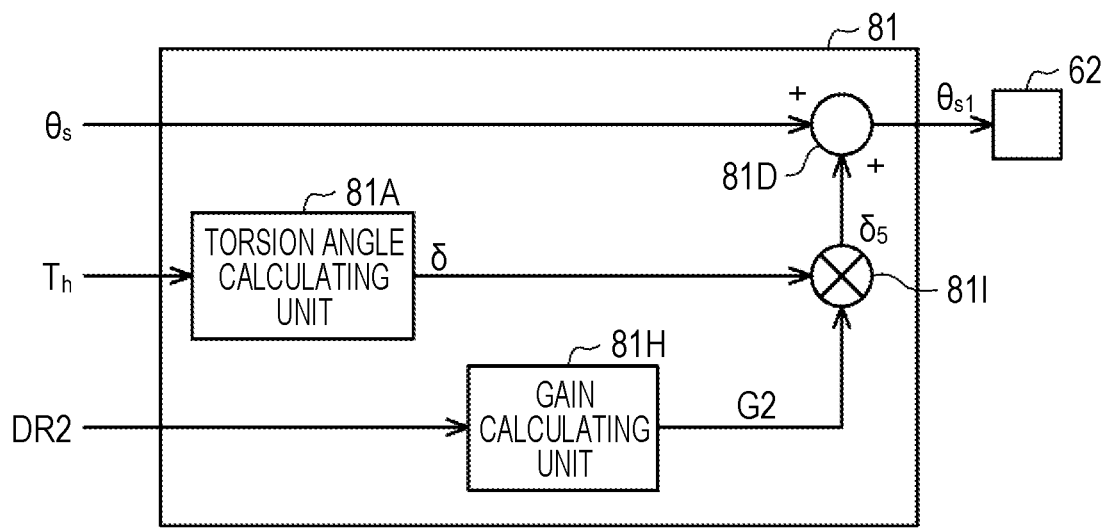
FIG. 17 is a block diagram illustrating a compensation value calculating unit according to a seventh embodiment.

As illustrated in FIG. 17, the compensation value calculating unit 81 includes a torsion angle calculating unit 81A, a gain calculating unit 81H, a multiplier 81I, and an adder 81D. That is, the compensation value calculating unit 81 according to this embodiment has a configuration obtained by omitting the gain calculating unit 81G from the compensation value calculating unit 81 according to the fourth embodiment illustrated in FIG. 11.

The torsion angle calculating unit 81A calculates the torsion angle δ of the torsion bar 34A based on the steering torque $T_h$ detected by the torque sensor 34. The gain calculating unit 81H calculates the gain G2 according to the distribution proportion DR2 of the current axial force F2 calculated by the distribution proportion calculating unit 72C. The gain calculating unit 81H calculates the gain G2 using the map M5 illustrated in FIG. 13.

The multiplier 81I calculates a final torsion angle $\delta_5$ by multiplying the torsion angle $\delta$ calculated by the torsion angle calculating unit 81A by the gain G2 calculated by the gain calculating unit 81H. When the value of the gain G2 is "1," the torsion angle $\delta$ calculated by the torsion angle calculating unit 81A is used as the final torsion angle $\delta_5$ without any change. When the value of the gain G2 is greater than "0" and less than "1," the value of the final torsion angle $\delta_5$ is less than the torsion angle $\delta$ calculated by the torsion angle calculating unit 81A. When the value of the gain G2 is "0," the value of the final torsion angle $\delta_5$ is "0."

The adder 81D calculates the final steering angle $\theta_{sl}$ which is used to calculate the target pinion angle $\theta_p$ by summing the steering angle $\theta_s$ calculated by the steering angle calculating unit 51 and the final torsion angle $\delta_5$ calculated by the multiplier 81I.

According to the seventh embodiment, the following advantageous effect can be achieved. (7) The value of the torsion angle $\delta$ of the torsion bar 34A which is added to the steering angle $\theta_s$ is changed according to the distribution proportion DR2 of the current axial force F2 having a correlation with the axial force gradient. That is, the degree of reflection of the torsion angle $\delta$ of the torsion bar 34A in the steering angle $\theta_s$ is changed according to the distribution proportion DR2 of the current axial force F2. Accordingly, it is possible to secure a good feeling of steering and to improve turning responsiveness to steering of the steering wheel 11.

Eighth Embodiment

An eighth embodiment in which a steering control device is applied to a steer-by-wire steering system will be described below. This embodiment basically has the same configuration as in the third embodiment described above with reference to FIG. 9. This embodiment is different from the third embodiment in the configuration of the compensation value calculating unit 81. Accordingly, the same members and constituents as in the third embodiment will be referred to by the same reference signs and detailed description thereof will be omitted.

Figure 18:
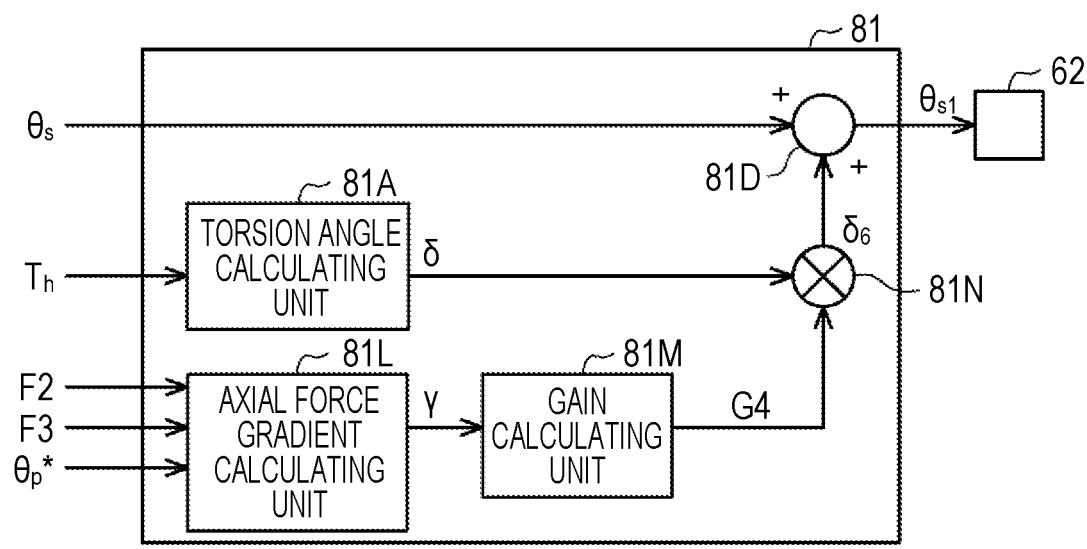
FIG. 18 is a block diagram illustrating a compensation value calculating unit according to an eighth embodiment.

As illustrated in FIG. 18, the compensation value calculating unit 81 includes a torsion angle calculating unit 81A, an axial force gradient calculating unit 81L, a gain calculating unit 81M, a multiplier 81N, and an adder 81D. The torsion angle calculating unit 81A calculates the torsion angle $\delta$ of the torsion bar 34A based on the steering torque $T_h$ detected by the torque sensor 34.

The axial force gradient calculating unit 81L receives the current axial force F2 calculated by the current axial force calculating unit 72B and the distributed axial force F3 calculated by the distributed axial force calculating unit 72D. The axial force gradient calculating unit 81L calculates a current axial force gradient $\gamma$ based on the current axial force F2 and the distributed axial force F3. The axial force gradient $\gamma$ is a slope which is a rate of change of the axial force with respect to the target pinion angle $\theta_p^*$.

The axial force gradient calculating unit 81L calculates a first slope which is a rate of change of the current axial force F2 with respect to the target pinion angle $\theta_p^*$. The axial force gradient calculating unit 81L calculates a second slope which is a rate of change of the distributed axial force F3 with respect to the target pinion angle $\theta_p^*$. For example, the axial force gradient calculating unit 81L compares the value of the first slope and the value of the second slope and sets the axial force gradient $\gamma$ based on the result of comparison. When value of the first slope is greater than the value of the second slope, the axial force gradient calculating unit 81L sets the first slope which is a gradient of the current axial force F2, as the axial force gradient $\gamma$. When the value of the second slope is greater than the value of the first slope, the axial force gradient calculating unit 81L sets the second slope which is the gradient of the distributed axial force F3, as the axial force gradient $\gamma$.

The axial force gradient calculating unit 81L may set an average value of the first slope and the second slope, as the axial force gradient $\gamma$. The gain calculating unit 81M receives the axial force gradient $\gamma$ calculated by the axial force gradient calculating unit 81L. The gain calculating unit 81M calculates a gain G4 according to the axial force gradient $\gamma$. The gain calculating unit 81M calculates the gain G4 using a map M7 which is stored in the storage device of the control device 50. The map M7 is a two-dimensional map in which a relationship between the axial force gradient $\gamma$ and the gain G4 is defined and has the following characteristics.

Figure 19:
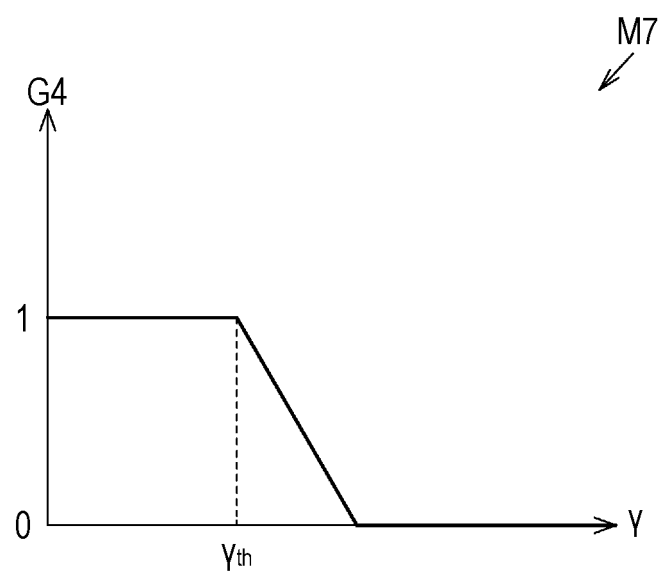
FIG. 19 is a graph illustrating a relationship between an axial force gradient and a gain according to the eighth embodiment.

That is, as illustrated in the graph of FIG. 19, when the value of the axial force gradient $\gamma$ is equal to or less than an axial force gradient threshold value $\gamma_{th}$, the value of the gain G4 is maintained at "1." When the value of the axial force gradient $\gamma$ is greater than the axial force gradient threshold value $\gamma_{th}$, the value of the gain G4 decreases gradually to "0" and then reaches "0" as the value of the axial force gradient $\gamma$ increases. After the value of the gain G4 has reached "0," the value of the gain G4 is maintained at "0" regardless of the increase of the value of the axial force gradient $\gamma$. The gain G4 can be set to change, for example, in steps of "0.1" in a range of "0" to "1."

As illustrated in FIG. 18, the multiplier 81N calculates a final torsion angle $\delta_6$ by multiplying the torsion angle $\delta$ calculated by the torsion angle calculating unit 81A by the gain G4 calculated by the gain calculating unit 81M.

When the value of the gain G4 is "1," the torsion angle $\delta$ calculated by the torsion angle calculating unit 81A is used as the final torsion angle $\delta_6$ without any change. When the value of the gain G4 is greater than "0" and less than "1," the value of the final torsion angle $\delta_6$ is less than the torsion angle $\delta$ calculated by the torsion angle calculating unit 81A. When the value of the gain G4 is "0," the value of the final torsion angle $\delta_6$ is "0."

The adder 81D calculates the final steering angle $\theta_{sl}$ which is used to calculate the target pinion angle $\theta_p$ by summing the steering angle $\theta_s$ calculated by the steering angle calculating unit 51 and the final torsion angle $\delta_6$ calculated by the multiplier 81N.

According to the eighth embodiment, the following advantageous effect can be achieved. (8) The value of the torsion angle $\delta$ of the torsion bar 34A which is added to the steering angle $\theta_s$ is changed according to the axial force gradient $\gamma$ based on the current axial force F2 and the distributed axial force F3. That is, the degree of reflection of the torsion angle $\delta$ of the torsion bar 34A in the steering angle $\theta_s$ is changed according to the axial force gradient $\gamma$. Accordingly, it is possible to secure a good feeling of steering and to improve turning responsiveness to steering of the steering wheel 11.

(9) A road surface state or an axial force acting on the turning shaft 14 is reflected in the current axial force F2. Accordingly, it is possible to more appropriately determine whether the torsion angle $\delta$ of the torsion bar 34A is to be added to the steering angle $\theta_5$ or whether responsiveness of the steering reaction force becomes excessively high when the torsion angle δ is added to the steering angle $θ_s$, based on the slope of the current axial force F2.

Other Embodiments

The first to eighth embodiments may be modified as follows. In the first embodiment, similarly to the third embodiment described above with reference to FIG. 9, the axial force calculating unit 72 may include an angle axial force calculating unit 72A, a current axial force calculating unit 72B, a distribution proportion calculating unit 72C, a distributed axial force calculating unit 72D, and a converter 72E. In this case, the "slope α which is a rate of change of the angle axial force F1" is replaced with the "slope α which is a rate of change of the distributed axial force F3." With this configuration as well, it is possible to achieve the same advantageous effect as in the first embodiment. That is, whether the torsion angle δ of the torsion bar 34A is to be added to the steering angle $θ_s$ is determined based on the slope α which is a rate of change of the distributed axial force F3. Accordingly, it is possible to secure a good feeling of steering and to improve turning responsiveness to steering of the steering wheel 11.

In the second embodiment, similarly to the third embodiment described above with reference to FIG. 9, the axial force calculating unit 72 may include an angle axial force calculating unit 72A, a current axial force calculating unit 72B, a distribution proportion calculating unit 72C, a distributed axial force calculating unit 72D, and a converter 72E. In this case, the "slope α which is a rate of change of the angle axial force F1" is replaced with the "slope α which is a rate of change of the distributed axial force F3." With this configuration as well, it is possible to achieve the same advantageous effect as in the second embodiment. That is, the value of the torsion angle δ of the torsion bar 34A which is added to the steering angle $θ_s$ is changed according to the slope α which is the rate of change of the distributed axial force F3. Accordingly, it is possible to secure a good feeling of steering and to improve turning responsiveness to steering of the steering wheel 11.

In the first to eighth embodiments, the reaction control unit 50a and the turning control unit 50b in the control device 50 may be configured as individual electronic control units (ECUs) which are independent. In the first to eighth embodiments, a clutch may be provided in the steering system 10. In this case, as indicated by an alternate long and two short dashes line in FIG. 1, the steering shaft 12 and the pinion shaft 13 are connected via a clutch 21. An electromagnetic clutch that supplies power and cuts off supply of power by supplying electric power and cutting off supply of electric power to an excitation coil is employed, as the clutch 21. The control device 50 performs engagement control for switching between engagement and disengagement of the clutch 21. When the clutch 21 is disengaged, transmission of power between the steering wheel 11 and the turning wheels 16 is mechanically cut off. When the clutch 21 is engaged, transmission of power between the steering wheel 11 and the turning wheels 16 is mechanically permitted.

What is claimed is:

1. A steering control device configured to control a reaction motor that generates a steering reaction force applied to a steering wheel based on a command value that is calculated according to a steering state, transmission of power between the steering wheel and a turning shaft that turns turning wheels being cut off, and the steering control device being configured to control a turning motor that generates a turning force for turning the turning wheels according to the steering state, the steering control device comprising an electronic control unit configured to:
calculate a target rotation angle of a shaft rotating with a turning operation of the turning wheels based on a steering angle of the steering wheel acquired from a rotation angle of the reaction motor;
calculate the command value based on the target rotation angle and a steering torque acquired from a torsion angle of a torsion bar twisting with an operation of the steering wheel; and
compensate for the torsion angle by adding the torsion angle as a compensation value to the steering angle,
wherein the electronic control unit is configured to change a value of the torsion angle that is added to the steering angle according to a degree of change of a state variable used to calculate the command value.

2. The steering control device according to claim 1, wherein:
the electronic control unit is configured to calculate the command value using an axial force of the turning shaft which is calculated based on the state variable; and
the electronic control unit is configured to change the value of the torsion angle that is added to the steering angle, according to a slope that is a rate of change of the axial force with respect to the state variable.

3. The steering control device according to claim 1, wherein:
the electronic control unit is configured to calculate the command value using an axial force of the turning shaft which is calculated based on the state variable; and
the electronic control unit is configured to determine whether the torsion angle of the torsion bar is to be added to the steering angle, based on a slope that is a rate of change of the axial force with respect to the state variable.

4. The steering control device according to claim 2, wherein the axial force is an angle axial force that is calculated based on the target rotation angle.

5. The steering control device according to claim 3, wherein the axial force is an angle axial force that is calculated based on the target rotation angle.

6. The steering control device according to claim 2, wherein the axial force is a distributed axial force that is acquired by summing values obtained by multiplying an angle axial force that is an axial force of the turning shaft calculated based on the target rotation angle and a current axial force that is an axial force of the turning shaft calculated based on a value of a current of the turning motor by respective distribution proportions that are individually set based on the target rotation angle and a vehicle speed.

7. The steering control device according to claim 3, wherein the axial force is a distributed axial force that is acquired by summing values obtained by multiplying an angle axial force that is an axial force of the turning shaft calculated based on the target rotation angle and a current axial force that is an axial force of the turning shaft calculated based on a value of a current of the turning motor by respective distribution proportions that are individually set based on the target rotation angle and a vehicle speed.

8. The steering control device according to claim 1, wherein:
the electronic control unit is configured to calculate the command value using a distributed axial force that is acquired by summing values obtained by multiplying an angle axial force that is an axial force of the turning shaft calculated based on the target rotation angle and a current axial force that is an axial force of the turning shaft calculated based on a value of a current of the turning motor by respective distribution proportions that are individually set based on the target rotation angle and a vehicle speed; and the electronic control unit is configured to change the value of the torsion angle that is added to the steering angle according to the distribution proportion that is individually set for the current axial force and a lateral acceleration that is an acceleration at a time when a vehicle is turning.

9. The steering control device according to claim 1, wherein:

the electronic control unit is configured to calculate the command value using a distributed axial force that is acquired by summing values obtained by multiplying an angle axial force that is an axial force of the turning shaft calculated based on the target rotation angle and a current axial force that is an axial force of the turning shaft calculated based on a value of a current of the turning motor by respective distribution proportions that are individually set based on the target rotation angle and a vehicle speed; and the electronic control unit is configured to determine whether the torsion angle of the torsion bar is to be added to the steering angle, based on the distribution proportion that is individually set for the current axial force and a lateral acceleration that is an acceleration at a time when a vehicle is turning.

10. The steering control device according to claim 1, wherein the electronic control unit is configured to change the value of the torsion angle that is added to the steering angle according to a slope that is a rate of change of the target rotation angle with respect to the steering angle.

11. The steering control device according to claim 1, wherein the electronic control unit is configured to determine whether the torsion angle of the torsion bar is to be added to the steering angle, according to a slope that is a rate of change of the target rotation angle with respect to the steering angle.

12. The steering control device according to claim 1, wherein:

the electronic control unit is configured to calculate the command value using a distributed axial force that is acquired by summing values obtained by multiplying an angle axial force that is an axial force of the turning shaft calculated based on the target rotation angle and a current axial force that is an axial force of the turning shaft calculated based on a value of a current of the turning motor by respective distribution proportions that are individually set based on the target rotation angle and a vehicle speed; and the electronic control unit is configured to change the value of the torsion angle that is added to the steering angle according to the distribution proportion that is individually set for the current axial force.

13. The steering control device according to claim 1, wherein:

the electronic control unit is configured to calculate the command value using a distributed axial force that is acquired by summing values obtained by multiplying an angle axial force that is an axial force of the turning shaft calculated based on the target rotation angle and a current axial force that is an axial force of the turning shaft calculated based on a value of a current of the turning motor by respective distribution proportions that are individually set based on the target rotation angle and a vehicle speed; and the electronic control unit is configured to determine whether the torsion angle of the torsion bar is to be added to the steering angle, based on the distribution proportion that is individually set for the current axial force.

14. The steering control device according to claim 1, wherein:

the electronic control unit is configured to calculate the command value using a distributed axial force that is acquired by summing values obtained by multiplying an angle axial force that is an axial force of the turning shaft calculated based on the target rotation angle and a current axial force that is an axial force of the turning shaft calculated based on a value of a current of the turning motor by respective distribution proportions that are individually set based on the target rotation angle and a vehicle speed; and the electronic control unit is configured to change the value of the torsion angle that is added to the steering angle according to a first slope that is a rate of change of the current axial force with respect to the target rotation angle and a second slope that is a rate of change of the distributed axial force with respect to the target rotation angle.

\* \* \* \* \*